(12) United States Patent
Kirkpatrick et al.

(10) Patent No.: US 9,965,047 B2
(45) Date of Patent: May 8, 2018

(54) BUTTON CONFIGURATION AND FUNCTION LEARNING

(71) Applicant: Crestron Electronics, Inc., Rockleigh, NJ (US)

(72) Inventors: Phillip Kirkpatrick, Rockleigh, NJ (US); Douglas Jacobson, Oradell, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 35 days.

(21) Appl. No.: 15/160,916

(22) Filed: May 20, 2016

(65) Prior Publication Data

US 2017/0024020 A1 Jan. 26, 2017

Related U.S. Application Data

(60) Provisional application No. 62/164,860, filed on May 21, 2015.

(51) Int. Cl.
*G06F 3/02* (2006.01)
*G06F 3/023* (2006.01)
*H05B 33/08* (2006.01)

(52) U.S. Cl.
CPC ........ *G06F 3/0238* (2013.01); *H05B 33/0845* (2013.01)

(58) Field of Classification Search
CPC ............................................ G06F 3/018–3/027
USPC ............................. 341/22–35; 345/168, 172
See application file for complete search history.

(56) References Cited

U.S. PATENT DOCUMENTS

| | | | |
|---|---|---|---|
| 8,077,058 B2 | 12/2011 | Swatsky et al. | |
| 8,149,591 B2 | 3/2012 | Feldstein et al. | |
| 2003/0015302 A1* | 1/2003 | Pessina | E06B 9/32 160/331 |
| 2004/0001098 A1* | 1/2004 | Numano | G06F 3/0489 715/773 |
| 2005/0137720 A1* | 6/2005 | Spira | G08C 23/04 700/19 |
| 2008/0136680 A1* | 6/2008 | Swatsky | H03K 17/94 341/22 |
| 2008/0136683 A1* | 6/2008 | Swatsky | H05B 37/0272 341/23 |
| 2010/0214756 A1* | 8/2010 | Feldstein | H01H 9/0271 361/807 |
| 2011/0234495 A1* | 9/2011 | Chan | G06F 3/0238 345/163 |
| 2012/0009974 A1* | 1/2012 | Sunderland | G06F 3/0238 455/550.1 |
| 2013/0016046 A1* | 1/2013 | Chou | G06F 1/3262 345/173 |

* cited by examiner

*Primary Examiner* — Roberto Flores
(74) *Attorney, Agent, or Firm* — Crestron Electronics, Inc.

(57) ABSTRACT

A keypad capable of being configured with multiple button configurations with buttons of various heights is configured to recognize the button configuration through actuations of the buttons. The keypad is placed in a configuration mode by inputting an unresolvable condition to the keypad. Once in the configuration mode, the buttons are individually actuated in a predefined order to configure the size and function of each button.

10 Claims, 31 Drawing Sheets

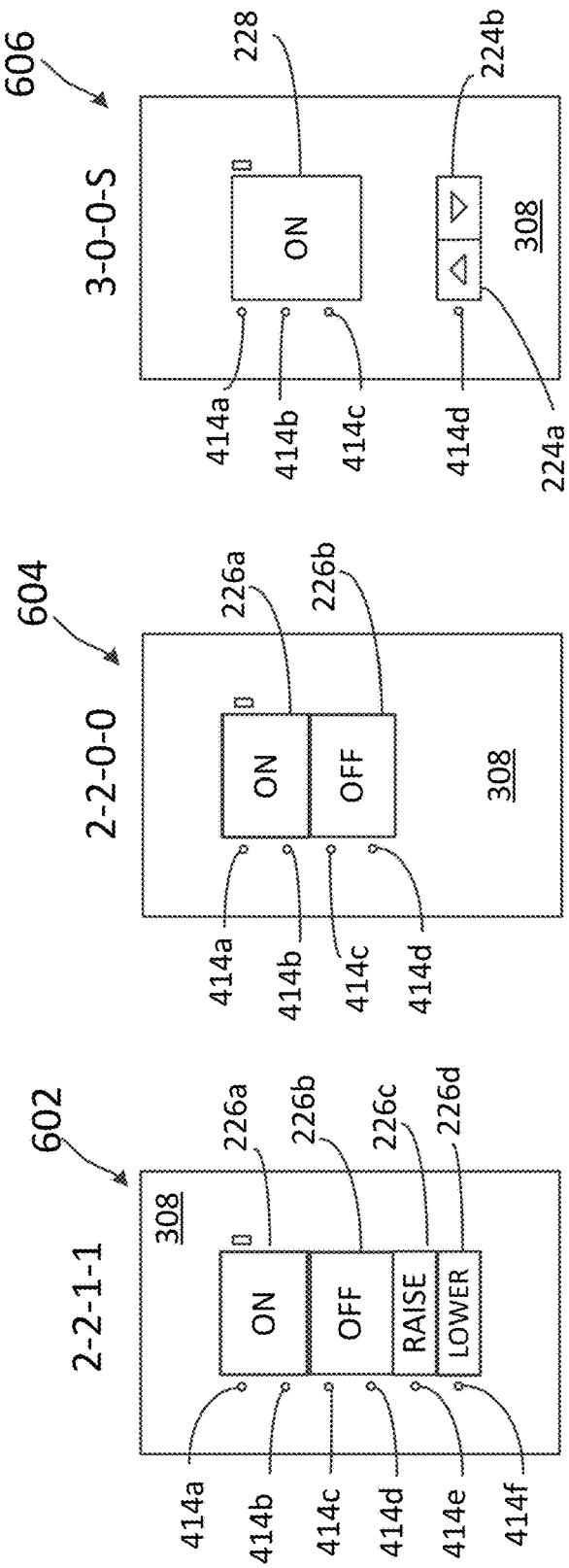

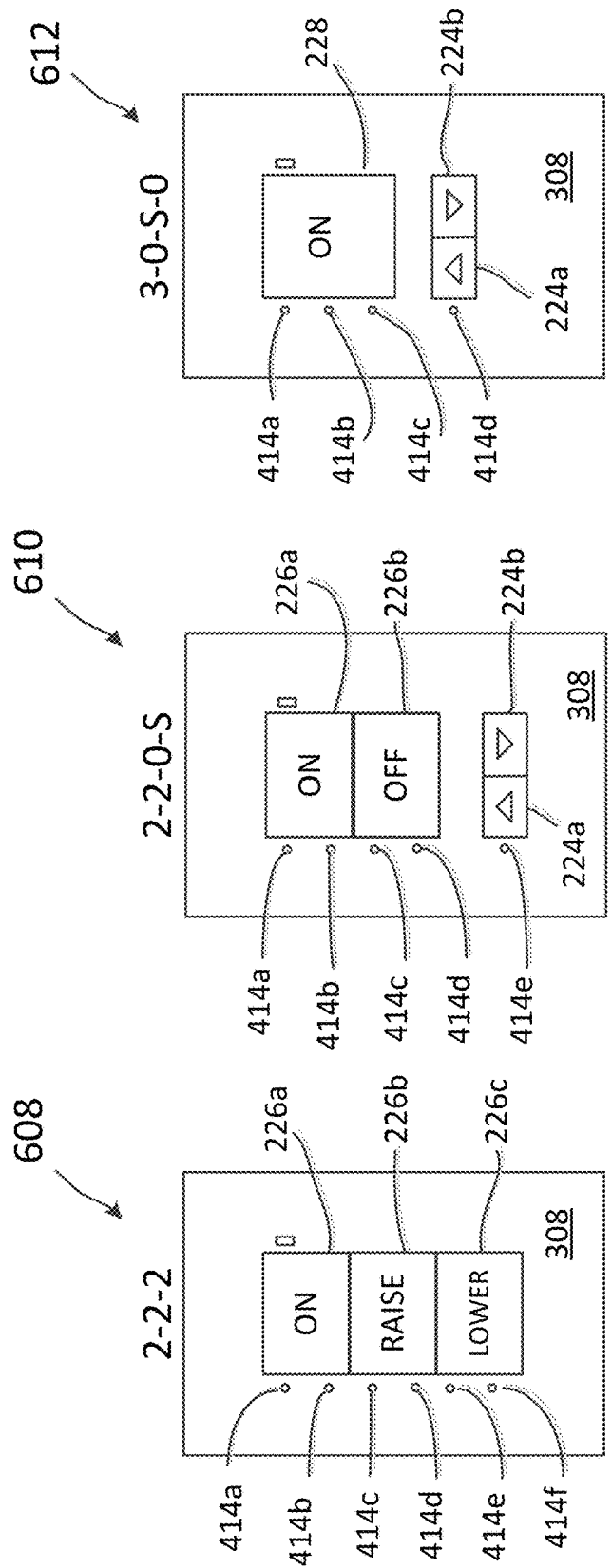

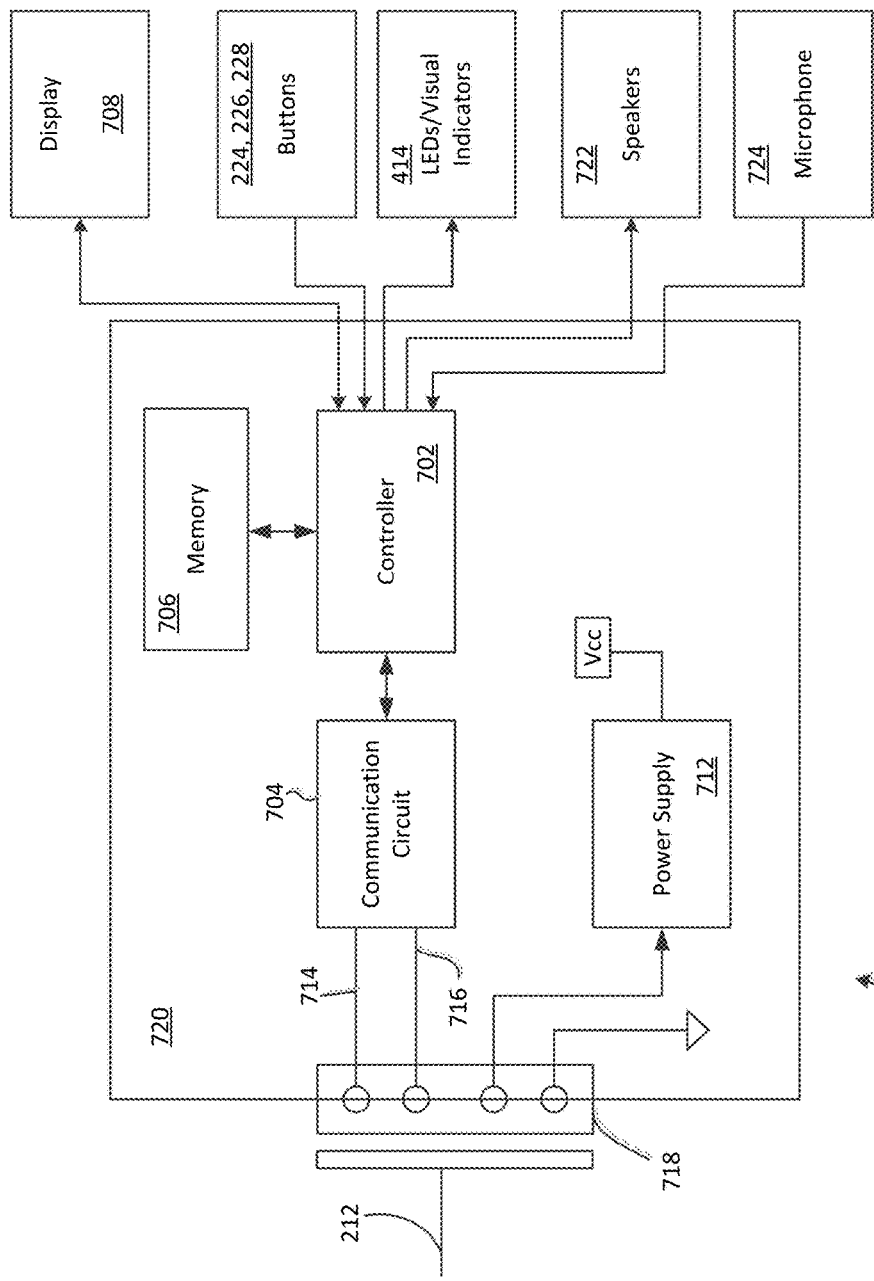

FIG. 15A
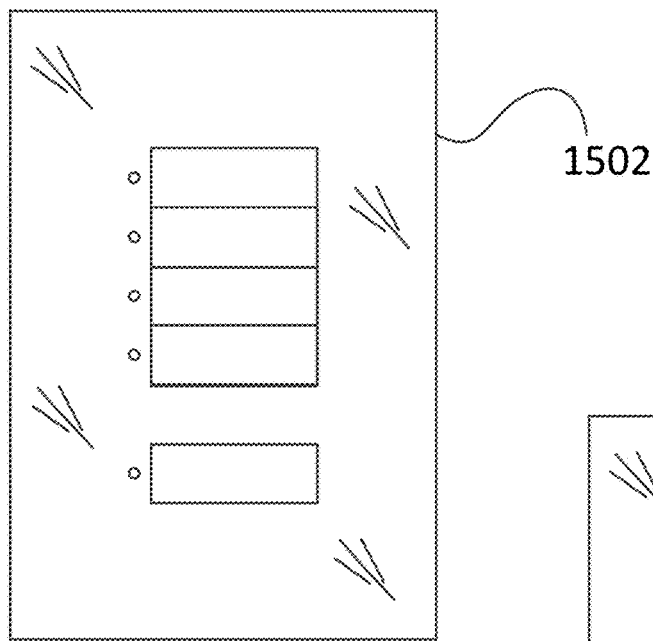
FIG. 15B
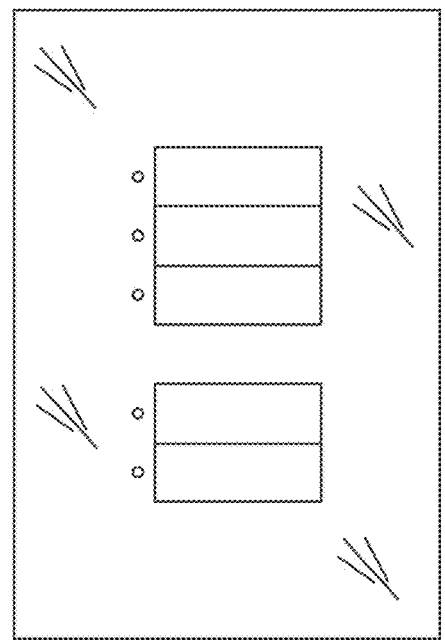
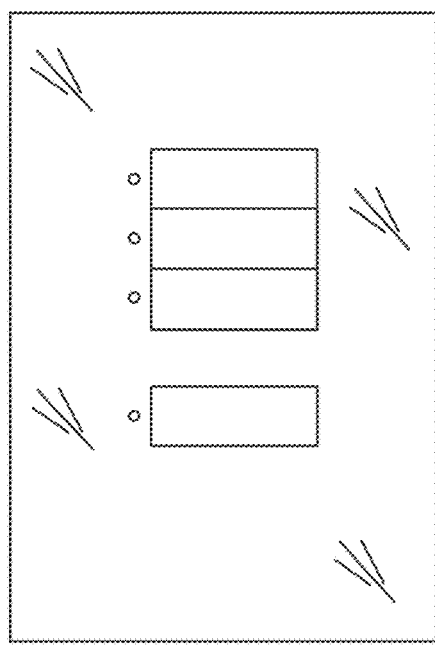
FIG. 15C

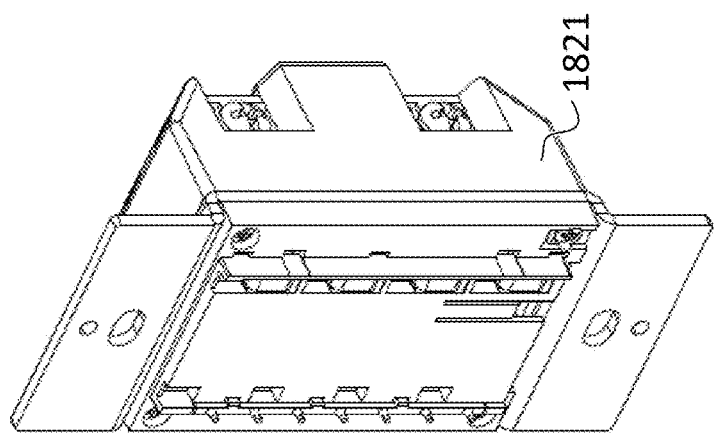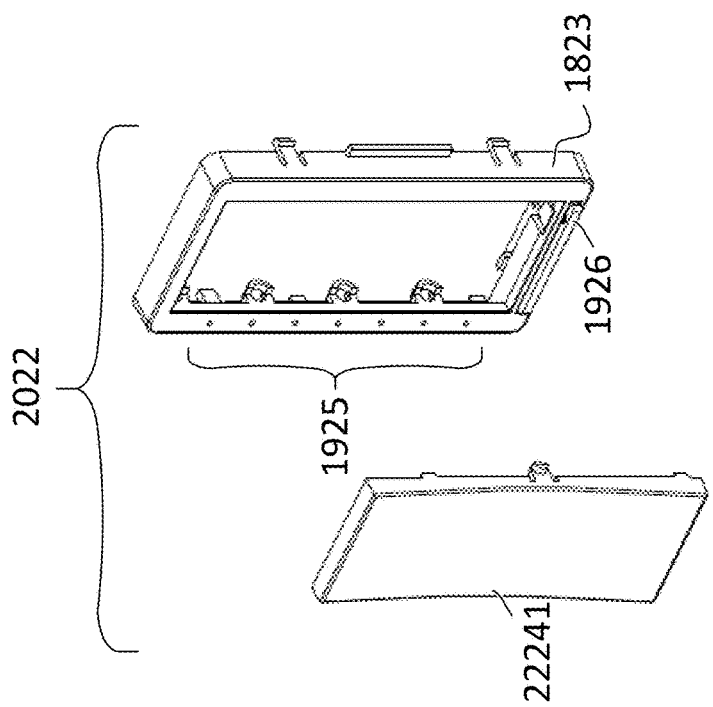
FIG. 22

2300

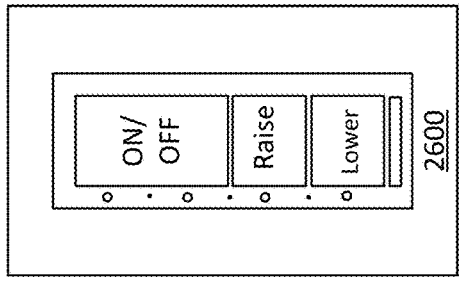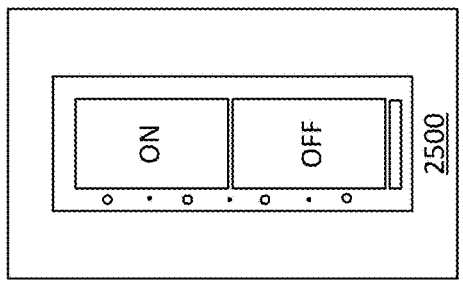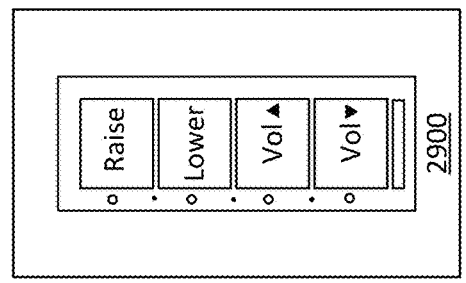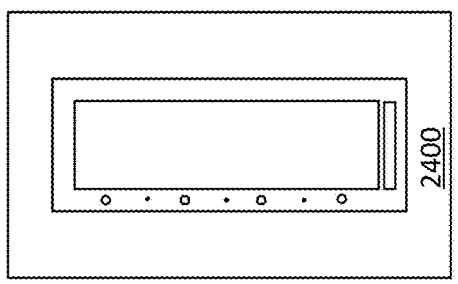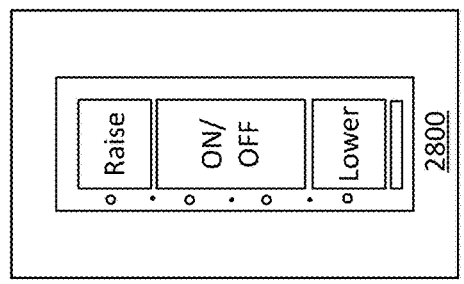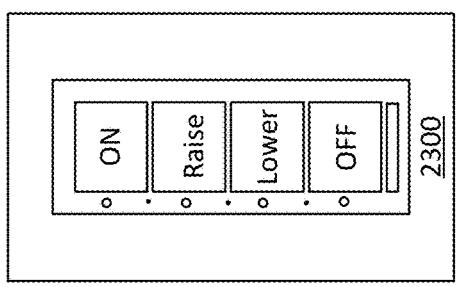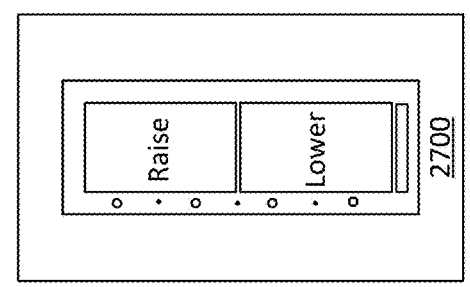
FIG. 25

BUTTON CONFIGURATION AND FUNCTION LEARNING

PRIORITY INFORMATION

The present application claims priority under 35 U.S.C. § 119(e) to U.S. Provisional Patent Application Ser. No. 62/164,860, filed 21 May 2015, the entire contents of which are expressly incorporated herein by reference.

BACKGROUND

Technical Field

Aspects of the embodiments relate to a keypad of a load control system for controlling the amount of power delivered to a plurality of electrical loads from an AC power source, and more particularly, to a method of easily configuring a keypad of a load control system with a new button configuration.

Background

Typical load control systems are operable to control the amount of power delivered to an electrical load, such as a lighting load or a motor load, from an alternating-current (AC) power source. A load control system generally comprises a plurality of control devices coupled to a communication link to allow for communication between the control devices. The load control system includes load control devices operable to control the amount of power delivered to the loads in response to digital messages received via the communication link or from local inputs, such as user actuations of a button. Further, the load control system often includes one or more keypads, which transmit commands across the communication link to control the loads coupled to the load control devices.

FIG. 1 is a simplified block diagram of known lighting control system 100. Lighting control system 100 comprises a multi-zone lighting control unit 112 coupled between an AC power source 114 and a plurality of lighting loads 116 to individually control the amount of power delivered to, and thus the intensity of, each of lighting loads 116. Lighting control unit 112 is coupled to communication link 118, which enables lighting control unit 112 to communicate with a plurality of keypads 120, 130, e.g., a keypad with two buttons and a keypad with five buttons, respectively. Communication link 118 can be implemented as, for example, a four-wire RS-485 communication link, among other types of communication links. Each of keypads 120, 130 is configured with a unique identifier, i.e., a unique address. Accordingly, lighting control unit 112 is operable to transmit digital messages to the keypads using the unique addresses of the keypads. Lighting control system 100 can also comprise additional keypads, which may each have a different number of buttons at different locations on the respective front surfaces of the keypads.

Keypads with configurable buttons are known those of skill in the art. The button configuration (i.e. the number and arrangement of buttons that are provided on the button assembly of the keypad) and button functionality (i.e. the functions that are selected by actuations of the buttons; an actuation is the pressing of the button such that a micro-switch located behind the button is pressed or actuated, causing or creating an electrical impulse or signal) can be modified in the field. For example, the faceplate and button assemblies can be removed and replaced to modify the button configuration. After changing the button configuration, an installer may then modify the button functionality of the keypad via programming.

Certain known keypads utilize a dual-inline package (DIP) switch mounted on a printed circuit board and accessible to the user to set the button address, as well as the button functionality and the button configuration. In this case, the switch locations create a digital word (typically 8 bits) that can be read by a processor. Because the switches of the DIP switch are used to dictate the button configuration of the keypad, the individual switches of the DIP switch must be changed when the button assembly is changed.

Since the individual switches of the DIP switch tend to be rather small and difficult to access, the process of setting DIP switches in order to configure keypads can be challenging. Accordingly, the keypads may be configured incorrectly. For example, two keypads can be configured with the same address, which causes communication errors and unreliable system operation. Also, in order to change the button functionality or the button configuration, the user must remove the faceplate and the button assembly to access the DIP switch, and must refer to a user guide in order to determine the appropriate positions of the individual switches of the DIP switch to achieve the desired functionality or configuration.

Known keypad configurations exhibit these types of problems. U.S. Pat. No. 8,077,058 assigned to Lutron Electronics Co., Inc. of Coopersburg, Pa. discloses a method for configuring a keypad of a load control system. A keypad of a load control system is operable to determine the button configuration of the button assembly installed on the keypad in response to simultaneous actuations of the top button and the bottom button of the button assembly for a predetermined amount of time. The keypad is further operable to store in a memory of the keypad data representing the button configuration. After the keypad is installed in the field and the button assembly is replaced, the keypad can allegedly be configured to operate with the new button assembly.

However, there are disadvantages associated with this and other methods of configuring a button panel. Accordingly, it would be desirable to provide methods, modes and systems for easily configuring a keypad of a load control system with a new button configuration.

SUMMARY

An object of the embodiments is to substantially solve at least the problems and/or disadvantages discussed above, and to provide at least one or more of the advantages described below.

It is therefore a general aspect of the embodiments to provide systems, methods, and modes for programming a control network and more specifically for programming a control network comprising one or more lighting, shade, and other types of controllable devices that will obviate or minimize problems of the type previously described.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

Aspects of the embodiments are directed towards devices, systems and methods for configuring a keypad via actuations of buttons of the keypad.

According to a first aspect of the embodiments, a method for configuring a keypad of a load control system is provided comprising the steps of: providing the keypad comprising a button assembly, the button assembly having a plurality of buttons, arranged in a known order; entering a configuration mode of the keypad by actuating a first subset of the plurality of buttons according to a first predefined sequence; determining the number and type of buttons by actuating each of the plurality of buttons according to a second predefined sequence; assigning a predefined set of functions to each of the determined plurality of buttons in the button assembly by actuating a second subset of the determined plurality of buttons according to a third predefined sequence; and exiting the configuration mode by actuating a third subset of the determined plurality of buttons according to a fourth predefined sequence.

According to the first aspect of the embodiments, the step of entering a configuration mode comprises: actuating a first unresolvable command by actuating two or more buttons substantially simultaneously.

According to the first aspect of the embodiments, the second predefined sequence comprises: actuating each of the plurality of buttons according to the order of top-to-bottom, and left-to-right in the event of split buttons, wherein split buttons each occupy one-half of a row of buttons.

According to the first aspect of the embodiments, the step of assigning a predefined set of functions to each of the determined buttons comprises: actuating one or more of the plurality of buttons following the step of determining the number and type of buttons by actuating each of the buttons according to the second predefined sequence.

According to the first aspect of the embodiments, the step of exiting the configuration mode comprises: actuating a second unresolvable command by actuating two or more buttons substantially simultaneously.

According to the first aspect of the embodiments, the first predefined sequence and the second predefined sequence comprises: entering a first unresolvable command, and entering a second unresolvable command, respectively, and wherein an unresolvable command is one that defined by actuation of the buttons to generate a digital word that is not unique to a button type and location.

According to the first aspect of the embodiments, the first and second unresolvable commands are not the same.

According to the first aspect of the embodiments, the first and second unresolvable commands are the same.

According to the first aspect of the embodiments, the method further comprises engraving the buttons on the keypad.

According to a second aspect of the embodiments, a method for configuring a keypad of a load control system is provided comprising: (a) providing the keypad comprising a base unit and a first button assembly, the first button assembly having a first button configuration defining a number and arrangement of one or more buttons comprising the first button assembly; (b) the keypad entering a configuration mode in response to an actuation of one or more buttons of the first button assembly; (c) alternately actuating one or more buttons of the first button assembly in a predefined sequence; (d) the keypad detecting the predefined sequence and recognizing said predefined sequence as corresponding to a second button configuration defining a number and arrangement of one or more buttons; (e) the keypad exiting the configuration mode in response to an actuation of one or more buttons of the first button assembly; (f) the keypad operating according to the second button configuration; (g) decoupling the first button assembly from the base unit of the keypad; and (h) coupling a second button assembly having the second button configuration to the base unit of the keypad.

According to the second aspect of the embodiments, (a) the step of the keypad entering a configuration mode in response to an actuation of one or more buttons of the first button assembly further comprises the keypad entering a configuration mode in response to an unresolvable command being input to the keypad via a first simultaneous actuation of a first button and a second button of the first button assembly for a predetermined amount of time; and (b) the step of the keypad exiting the configuration mode in response to an actuation of one or more buttons of the first button assembly further comprises the keypad entering the configuration mode in response to an unresolvable command being input to the keypad via a second simultaneous actuation of the first button and the second button of the first button assembly for the predetermined amount of time.

According to the second aspect of the embodiments, (a) the step of the keypad entering a configuration mode in response to an actuation of one or more buttons of the first button assembly further comprises the keypad entering a configuration mode in response to actuations of one or more buttons of the first button assembly in a second predefined sequence; and (b) the step of the keypad exiting the configuration mode in response to an actuation of one or more buttons of the first button assembly further comprises the keypad entering the configuration mode in response to actuations of one or more buttons of the first button assembly in a second predefined sequence.

According to the second aspect of the embodiments, the second predefined sequence comprises three successive actuations of a first button of the first button assembly, and wherein a third actuation of the first button is for a predetermined amount of time.

According to the second aspect of the embodiments, (a) the predefined sequence further corresponds to a functionality template, the functionality template defining a function of each of the one or more buttons of the second button assembly; and (b) the step of the keypad operating according to the second button configuration further comprises the keypad operating according to the functionality template.

According to the second aspect of the embodiments, the functionality template may correspond to one of the following: lighting control, window shade control and lighting and window shade control.

According to the second aspect of the embodiments, (a) the predefined sequence further corresponds to a physical characteristic of the keypad; and (b) the step of the keypad operating according to the second button configuration further comprises the keypad operating according to the physical characteristic of the keypad.

According to the second aspect of the embodiments, the physical characteristic of the keypad is a button color.

According to the second aspect of the embodiments, (a) the predefined sequence further corresponds to a user profile; and (b) the step of the keypad operating according to the second button configuration further comprises the keypad operating according to the user profile.

According to the second aspect of the embodiments, the method further comprises (a) providing feedback that the keypad has entered the configuration mode; and (b) providing feedback that the keypad has exited the configuration mode.

According to the second aspect of the embodiments, the method further comprises providing feedback indicating the second button configuration.

According to the second aspect of the embodiments, the second button assembly comprises buttons of varying height.

According to a third aspect of the embodiments, a method for installing a keypad of a load control system is provided comprising: (a) providing a keypad comprising a base unit and a default button assembly, the default button assembly having (i) a default button configuration defining a number and arrangement of one or more buttons comprising the default button assembly, and (ii) a default functionality template defining a function of each of the one or more buttons of the default button assembly; (b) the keypad entering a configuration mode in response to an unresolvable command being input to the keypad via a first simultaneous actuation of a first button and a second button of the default button assembly for a predetermined amount of time; (c) alternately actuating one or more buttons of the default button assembly in a predefined sequence; (d) the keypad detecting the predefined sequence and recognizing said predefined sequence as corresponding to (i) a replacement button configuration defining a number and arrangement of one or more buttons, and (ii) a replacement functionality template defining a function of one or more buttons; (e) the keypad exiting the configuration mode in response to an unresolvable command being input to the keypad via a second simultaneous actuation of the first button and the second button of the default button assembly for the predetermined amount of time; (f) the keypad operating according to the replacement button configuration and replacement functionality template; (g) decoupling the default button assembly from the base unit of the keypad; and (h) coupling a replacement button assembly having the replacement button configuration to the base unit of the keypad.

According to the third aspect of the embodiments, the default button configuration is a 1-1-1-1-S-S button configuration, wherein the number "1" indicates the number of rows the button covers, and the "S" indicates that the button is a single row split button, or two buttons per row.

According to the third aspect of the embodiments, the method further comprises: (a) providing feedback that the keypad has entered the configuration mode; and (b) providing feedback that the keypad has exited the configuration mode.

According to the third aspect of the embodiments, the default button configuration is the same as the replacement button configuration.

According to the third aspect of the embodiments, the default functionality template is the same as the replacement functionality template.

According to the third aspect of the embodiments, the replacement functionality template may correspond to one of the following: lighting control, window shade control and lighting and window shade control.

According to a fourth aspect of the embodiments, a method for installing a keypad of a load control system is provided comprising: (a) providing a keypad comprising a base unit and a default button assembly, the default button assembly having (i) a default button configuration defining a number and arrangement of one or more buttons comprising the default button assembly, (ii) a default functionality template defining a function of each of the one or more buttons of the default button assembly, and (iii) a default button color; (b) mounting the keypad in a wall box; (c) the keypad entering a configuration mode in response to an unresolvable command being input to the keypad via a first simultaneous actuation of a first button and a second button of the default button assembly for a predetermined amount of time; (d) alternately actuating one or more buttons of the default button assembly in a predefined sequence; (e) the keypad detecting the predefined sequence and recognizing said predefined sequence as corresponding to (i) a replacement button configuration defining a number and arrangement of one or more buttons, (ii) a replacement functionality template defining a function of one or more buttons, and (iii) a replacement button color; (f) the keypad exiting the configuration mode in response to an unresolvable command being input to the keypad via a second simultaneous actuation of the first button and the second button of the default button assembly for the predetermined amount of time; (g) the keypad operating according to the replacement button configuration, replacement functionality template, and replacement button color; (h) decoupling the default button assembly from the base unit of the keypad; and (i) coupling a temporary button assembly having the replacement button configuration to the base unit of the keypad; (j) engraving each button of a replacement button assembly with a legend indicating a button function according to the replacement functionality template, the replacement button assembly having the replacement button configuration; (k) decoupling the temporary button assembly from the base unit of the keypad; and (l) coupling the replacement button assembly to the base unit of the keypad.

According to a fifth aspect of the embodiments, a method is provided for configuring a keypad of a load control system wherein the keypad is configured for receiving buttons of varying heights. The method comprises receiving the keypad comprising a base unit and a first button assembly, the first button assembly having a first button configuration defining a number and arrangement of buttons on the first button assembly; placing the keypad in a configuration mode via actuations of one or more buttons of the first button assembly; alternately actuating one or more buttons of the first button assembly in a predefined sequence; the keypad detecting the predefined sequence and associating the predefined sequence with a corresponding second button configuration, the second button configuration defining a number and arrangement of buttons on the button assembly; taking the keypad out of the configuration mode via actuations of one or more buttons of the first button assembly; the keypad operating according to the corresponding button configuration; decoupling the first button assembly from the base unit; and coupling a second button assembly having the second button configuration to the base unit.

According to a sixth aspect of the embodiments, a method is provided for installing a keypad of a load control system wherein the keypad is configured for receiving buttons of varying heights. The method comprises receiving a keypad kit comprising a keypad and one or more replacement buttons, the keypad further comprising a default button assembly, the default button assembly having a default button configuration defining a number and arrangement of buttons on the default button assembly and a default functionality template; entering a configuration mode by inputting an unresolvable command to the keypad via simultaneous actuation of a first button and a second button for a predetermined amount of time; alternately actuating one or more buttons of the first button assembly in a predefined sequence; the keypad detecting the predefined sequence and associating the predefined sequence with a corresponding replacement button configuration and replacement functionality template, the replacement button configuration defining a number and arrangement of buttons on the replacement button assembly; exiting a configuration mode by inputting the unresolvable command to the keypad via simultaneous actuation of the first button and the second button for the predetermined amount of time; the keypad operating according to the replacement button configuration and replacement button functionality; mechanically decoupling the first button assembly from a base unit of the keypad; and mechanically coupling a second button assembly having the second button configuration to the base unit of the keypad.

BRIEF DESCRIPTION OF DRAWINGS

The above and other objects and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

FIGS. 6A-F illustrate front views of the six row keypad with various button configurations according to aspects of the embodiments.

FIG. 7 is a simplified schematic of a circuit that can be used with, or as a component of, the six and four row keypad, as well as used with or as a component of, the load control device as shown in FIG. 2, according to aspects of the embodiments.

FIGS. 15A-15C illustrate first, second, and third faceplate panel cutouts according to aspects of the embodiments.

FIG. 22 illustrates the wall box dimmer having a singe primary function button according to aspects of the embodiments.

FIGS. 23-25 illustrates a plurality of examples of four row rocker switch keypads, and four row button switch keypads, each of which that can be programmed and configured according to aspects of the embodiments described herein, in a manner substantially similar to that as described in reference to FIGS. 8, 17, and 18-22, among others.

DETAILED DESCRIPTION

Figure 1:
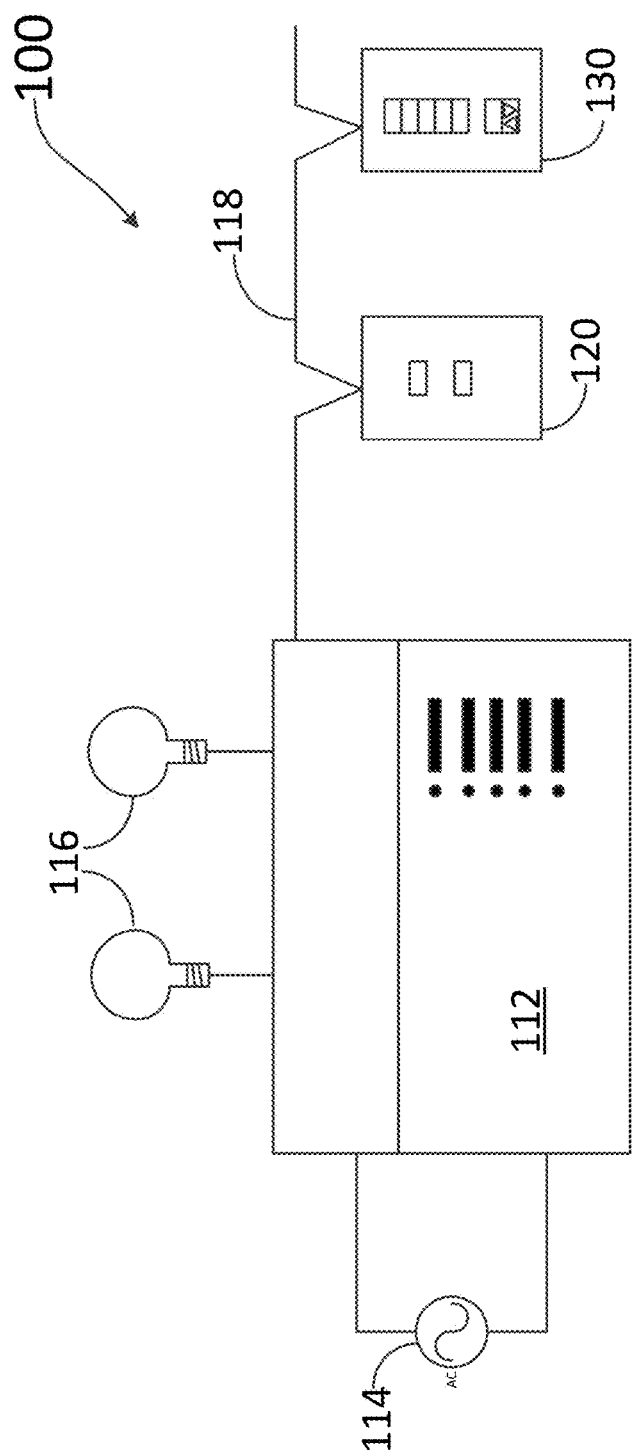
FIG. 1 is a simplified block diagram of a known lighting control system.

Aspects of the embodiments are generally implemented as a keypad adapted for receiving various button configurations, and which can be used in a lighting control system incorporating a keypad, but is not limited thereto, except as may be set forth expressly in the appended claims.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The following embodiments are discussed, for simplicity, with regard to the terminology and structure of a lighting control system. However, the embodiments to be discussed next are not limited to these systems but can be applied to control of other systems including, but not limited to audio visual systems, environmental control systems, among others.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

Described herein is a keypad capable of being adapted with multiple button configurations, with buttons of various heights adapted to recognize the button configuration through actuations of the buttons. The keypad can be placed in a configuration mode by inputting an unresolvable condition to the keypad. Once in the configuration mode, the buttons can be individually actuated in a predefined order to configure the size and function of each button.

The following is a list of the elements of the figures in numerical order:
100 Known Lighting Control System
112 Lighting Control Unit
114 AC Power Source
116 Lighting Load
118 Communication Link
120 Known Two Button Keypad (Two Button Keypad)
130 Known Five Button Keypad (Five Button Keypad)
200 Load Control System (LCS)
202 AC Power Source
204 Lighting Load
206 Motorized Roller Shade
208 Electronic Drive Unit (EDU)
210 Load Control Device (LCD)
212 Communication Link
214 Six Row Keypad
222 Single Height Button
224 Split Button
226 Double Height Button
228 Triple Height Button
306 Button Row
308 Faceplate
310 Visual Indicator Openings
312 Bezel Frame
402 Base Unit
404 Button Receiving Assembly
406 Bezel Horizontal Tabs
408 Box Horizontal Tab Receivers
410 Bezel Vertical Tabs
412 Box Vertical Tab Receivers
414 Visual Indicators
416 Opening of Faceplate
418 Outlet and Switch (Wall) Box
420 Tactile Switches
422 Button Receivers
424 Photocell
426 Photocell Opening
501-551 Examples of Button Configurations for Keypad 214
602 2-2-1-1 Button Configuration of a Keypad
604 2-2-0-0 Button Configuration of a Keypad
606 3-0-0-S Button Configuration of a Keypad
608 2-2-2 Button Configuration of a Keypad
610 2-2-0-S Button Configuration of a Keypad
612 3-0-S-0 Button Configuration of a Keypad
700 Circuit of Keypad
702 Controller
704 Communication Circuit
706 Memory
708 Display
712 Power Supply
714 MuxBar
716 MUX
718 Connector
720 Frame
722 Speakers
724 Microphone
800 Method for Configuring Buttons of Keypad For Use With a Load Control Device and Controllable Devices
802-814 Method Steps of Method 800
900 2-2-S-S Keypad
902-914 Buttons for Keypad 900
1000 2-2-S-S Keypad
1100 1-1-1-1-S-S Keypad
1200 3-3 Keypad
1300 2-2-2 Keypad
1502 First Faceplate Panel Cutout
1504 Second Faceplate Panel Cutout
1506 Third Faceplate Panel Cutout
1602 First Scene Keypad
1604 Second Scene Keypad
1700 Method for Programming, Configuring, and Engraving Keypad 214
1702-1726 Method Steps of Method 1700
1820 Wall Box Dimmer(s)
1821 Enclosure (part of Dimmer 1820)
1823 Bezel (part of Bezel kit 2022)
1831 Faceplate
1832 Electrical Wall Box
1924 Primary Function Button (part of Bezel Kit 2022)
1925 Vertical Column of Light Emitting Diodes (LEDs)
1926 Dual Function Air-Gap Switch Actuator
19261 First End Portion (of Dual Function Air-Gap Switch Actuator 1926)
2022 Removable Bezel Kit (part of Dimmer 1820)
21211 Air-Gap Contacts (main power disconnect)
21212 Secondary Function Switch (mounted within Enclosure 1821)
21262 Second End Portion (of Dual Function Air-Gap Switch Actuator 1926)
22241 Primary Function Button
2300 First Example of Four Row Keypad
2400 Second Example of Four Row Keypad
2500 Third Example of Four Row Keypad
2600 Fourth Example of Four Row Keypad
2700 Fifth Example of Four Row Keypad
2800 Sixth Example of Four Row Keypad
2900 Seventh Example of Four Row Keypad Used throughout the specification are several acronyms, the meanings of which are provided as follows:
AC Alternating Current
ASIC Application Specific Integrated Circuit
AV Audio/Visual
DC Direct Current
DIP Dual Inline Package
EDU Electronic Drive Unit
IR Infra-Red
LCS Load Control System
LED Light Emitting Diode
OEM Original Equipment Manufacturer
PLD Programmable Logic Device
RF Radio Frequency Aspects of the embodiments are generally implemented as keypad adapted for receiving various button configurations.

Figure 2:
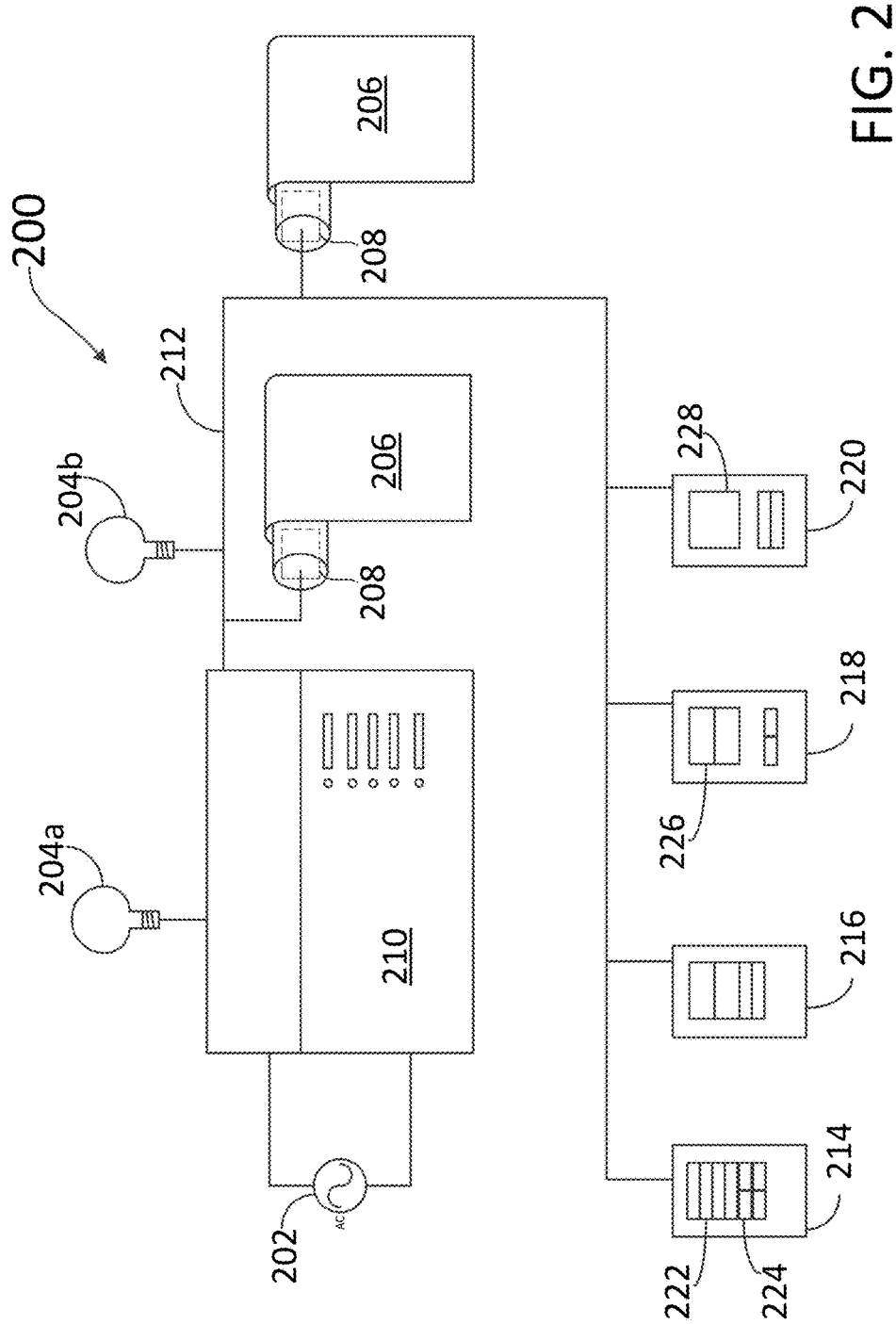
FIG. 2 is a simplified block diagram of a load control system for control of a plurality of lighting loads and a plurality of motorized window treatments that uses a keypad of a load control system according to aspects of the embodiments.

FIG. 2 is a block diagram of load control system 200 for control of a plurality of lighting loads and a plurality of motorized window treatments, e.g. motorized roller shades from an AC power source, according to aspects of the embodiments. Load control system (LCS) 200 comprises multi-zone load control device 210, which comprises integral dimmer circuits for controlling the intensities of lighting loads 204. According to further aspects of the embodiments, lighting loads 204 can each contain internal dimmer circuits so that commands can be sent to them to dim them accordingly; in this case, lighting loads 204 can be connected directly to communication link 212, as lighting load 204b illustrates. Lighting load 204a is connected directly to load control device 210. Each of motorized roller shades (roller shades) 206 comprises at least one electronic drive unit (EDU) 208, which can be located inside the roller tube of roller shade 206. Load control device 210 is operable to communicate with EDUs 208 via communication link 212 that can comprise a wired four-wire RS-485 communication link. Alternatively, communication link 212 can comprise a wireless communication link, such as, for example, a radio-frequency (RF) or an infrared (IR) communication link. As those of skill in the art can further appreciate, load control system 200 can be further modified to control security and environmental systems, among others, and as such, load control device 210 can include speakers, displays, microphones, and the like (none of which have been included in FIG. 2).

Load control device 210 and EDUs 208 are responsive to digital messages received via communication link 212 from a plurality of first through fourth six row keypads 214a-d. As those of skill in the art can appreciate, LCS 200 can include less or more keypads 214 (keypads 214 and their button configurations are discussed in greater detail in regard to FIGS. 5A-5F, and FIGS. 6A-6F, among other Figures). The user is able to adjust the intensities of lighting loads 204 or to select a lighting preset of load control device 210 using keypads 214a-214d by inputting commands to the keypads via button actuations. The user is also able to open or close roller shades 206, adjust the positions of the shade fabrics of roller shades 206, or set roller shades 206 to preset shade positions using any one of keypads 214a-214d by inputting commands to the keypad via button actuations. The load control device 210 and EDUs 208 are both operable to be controlled in response to a signal digital message transmitted across communication link 212. For example, a single preset can include preset lighting intensities and preset shade positions according to aspects of the embodiments. Each of the keypads 214a-214d comprise one or more of single height buttons 222, split buttons 224, double height buttons 226 and triple height buttons 228, as described and shown in greater detail below.

Figure 3:
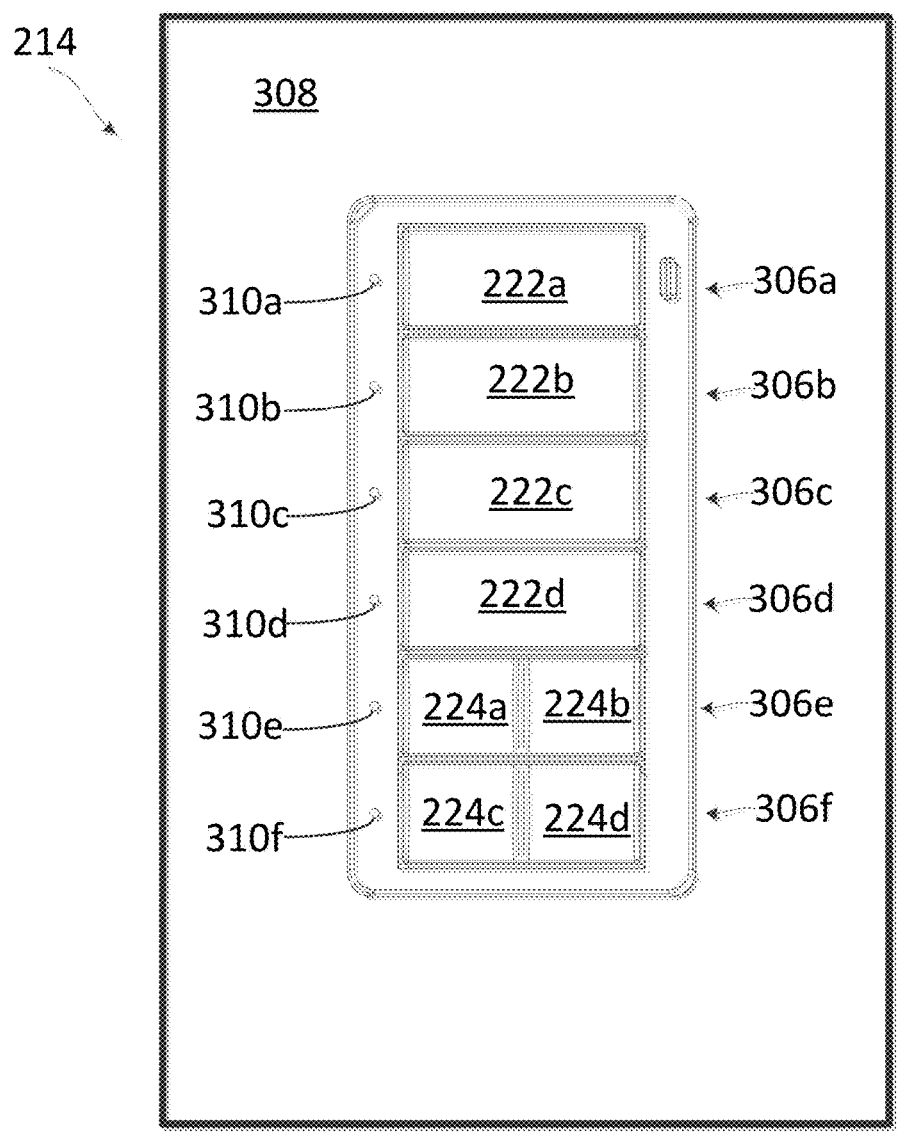
FIG. 3 is a front view of a six row keypad according to aspects of the embodiments.

FIG. 3 is a front view of six-row keypad 214 with four single height buttons 222a-222d and four split buttons 224a-224d, according to aspects of the embodiments. Commonly assigned U.S. Pat. No. D636,738 discloses a design for a similar keypad configuration. Keypad 214 comprises six button rows 306a-f and is adapted for receiving a combination of one or more single height buttons 222a-d, double height buttons (not shown) and triple height buttons (also not shown). Depending on height, each button can occupy one or more button rows 306. Each triple height button can cover three button rows 306. Each double height button covers two button rows 306, and a single height button 222 covers a single button row 306. Additionally, the bottom two rows 306e,f of keypad 214 are each adapted for receiving two half-width split buttons (split buttons) 224a-d (of single height) according to aspects of the embodiments.

Keypad 214, as shown in FIG. 3, includes four single height buttons 222a-d, and four split key "raise" buttons 224a and 224c, and two split key "lower" buttons 224b and 224d. Each of buttons 222a-d can be engraved and programmed (although engraving is optional) to perform functions such as turning the lights on or off, raising or lowering shades, or can be programmed as a "scene selection" in which scenes for the load devices that might be located in the room—lights, shades, audio, security, among others—can be pre-programmed such that by simply pressing one button the devices go to their pre-programmed positions.

Split buttons are typically used to embody "raise-lower" functions, whether for shades (raise or lower the shades) or lighting (brighten or dim the lights) or volume (increase the volume, or decrease the volume). Keypad 214 also includes six visual indicator openings 310a-f that are located next to each button row 306, respectively, to allow light from visual indicators (not shown), to illuminate through. According to aspects of the embodiments and by way of non-limiting example only, in the embodiment of FIG. 3 the split buttons, when mounted on keypad 214, are adapted to contact at least one tactile switch 420, the operation of which is discussed in greater detail below. Actuations of the first, second, and third buttons 222a-c select first, second, and third lighting presets, respectively. An actuation of the off button 222d causes load control device 210 to select an "off" scene, i.e., one in which all of lighting loads 204 are turned off. Actuations of the raise buttons 224a and 224c, and the lower buttons 224b and 224d, cause load control device 210 to respectively raise and lower the intensities of lighting loads 204 or a single lighting load 204 (according to how the configuration programmed by keypad 214). Keypad 214 can be alternatively configured such that buttons 222a-d, and 224a-d have different button functionalities. Keypad buttons 222a-d, and 224a-d can function to control one or more window treatments or a combination of one or more lighting loads 204 and one or more roller shades 206.

Figure 4:
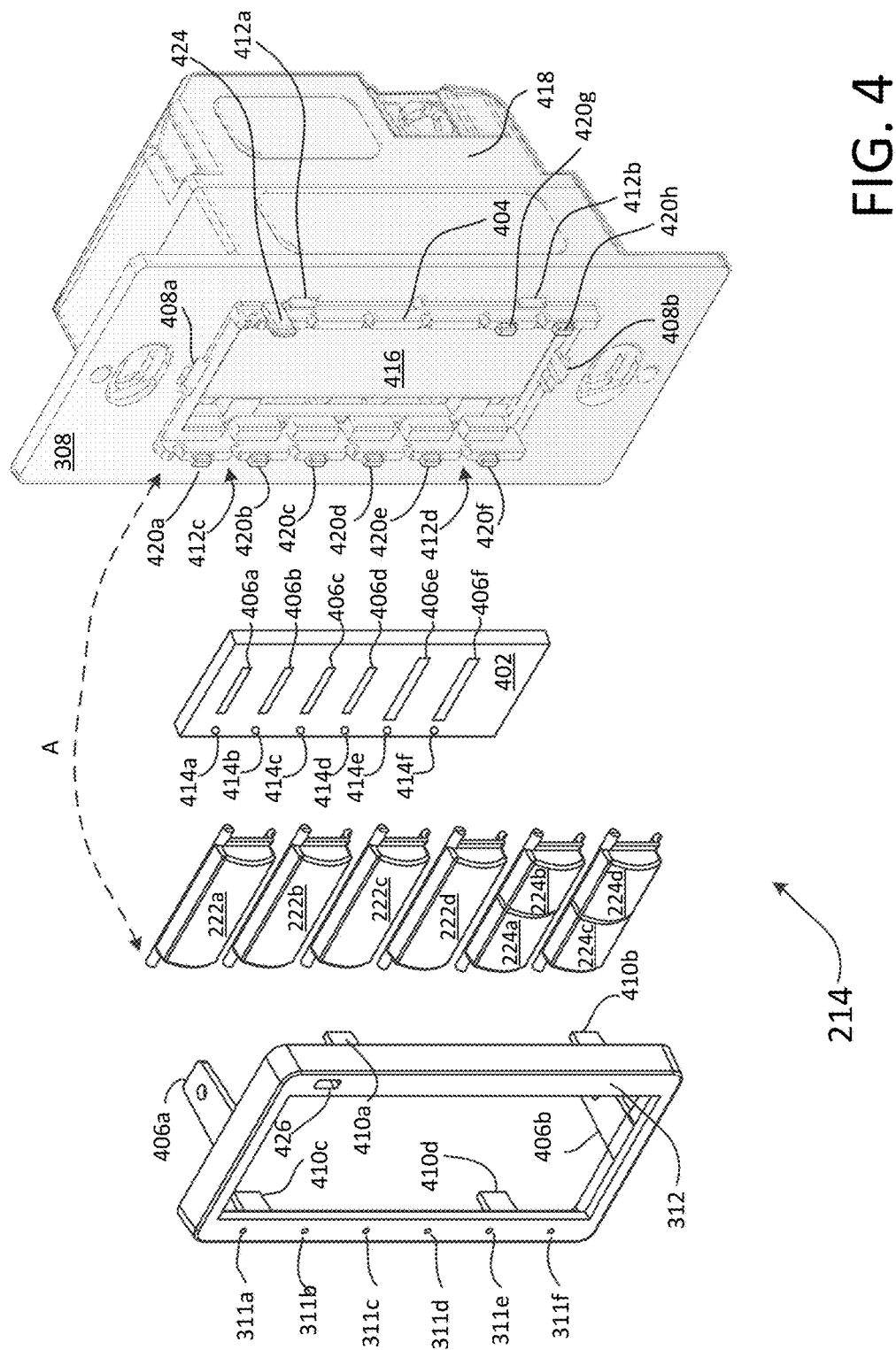
FIG. 4 is an exploded perspective view of the six row keypad of FIG. 3 according to aspects of the embodiments.
Figure 5A:
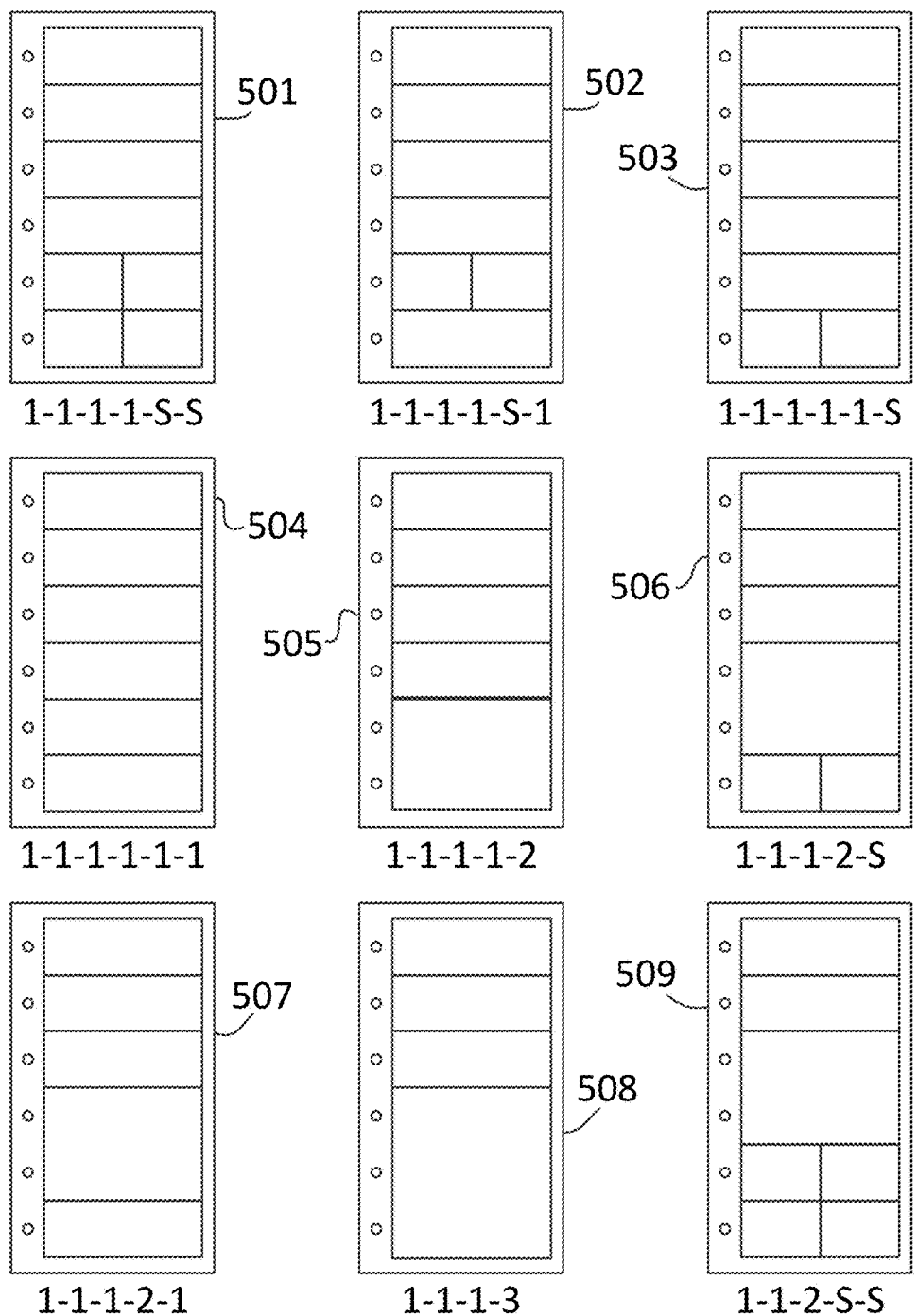
FIGS. 5A-5F illustrate front views of the six row keypad with different button configurations according to aspects of the embodiments.
Figure 5B:
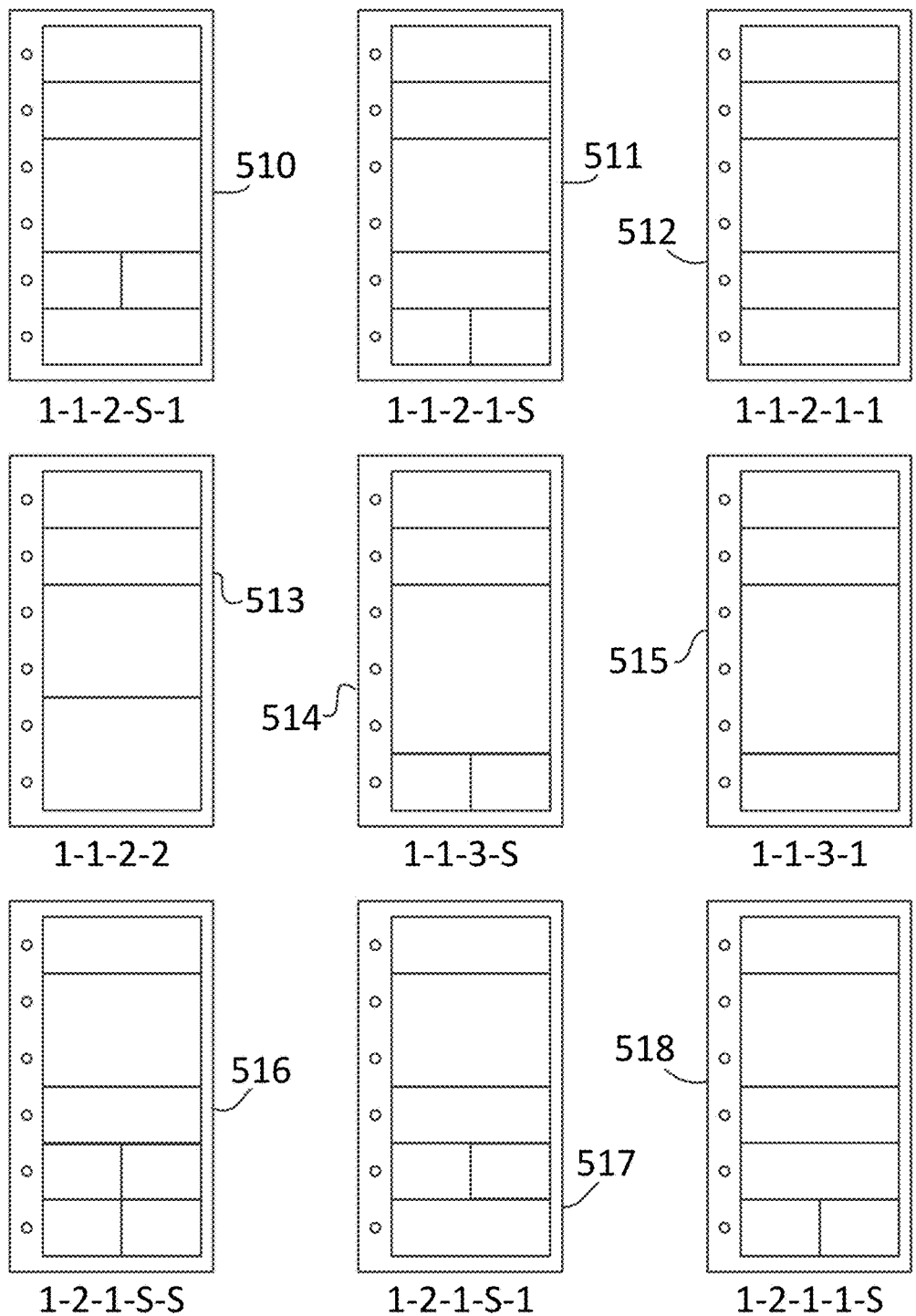
Figure 5C:
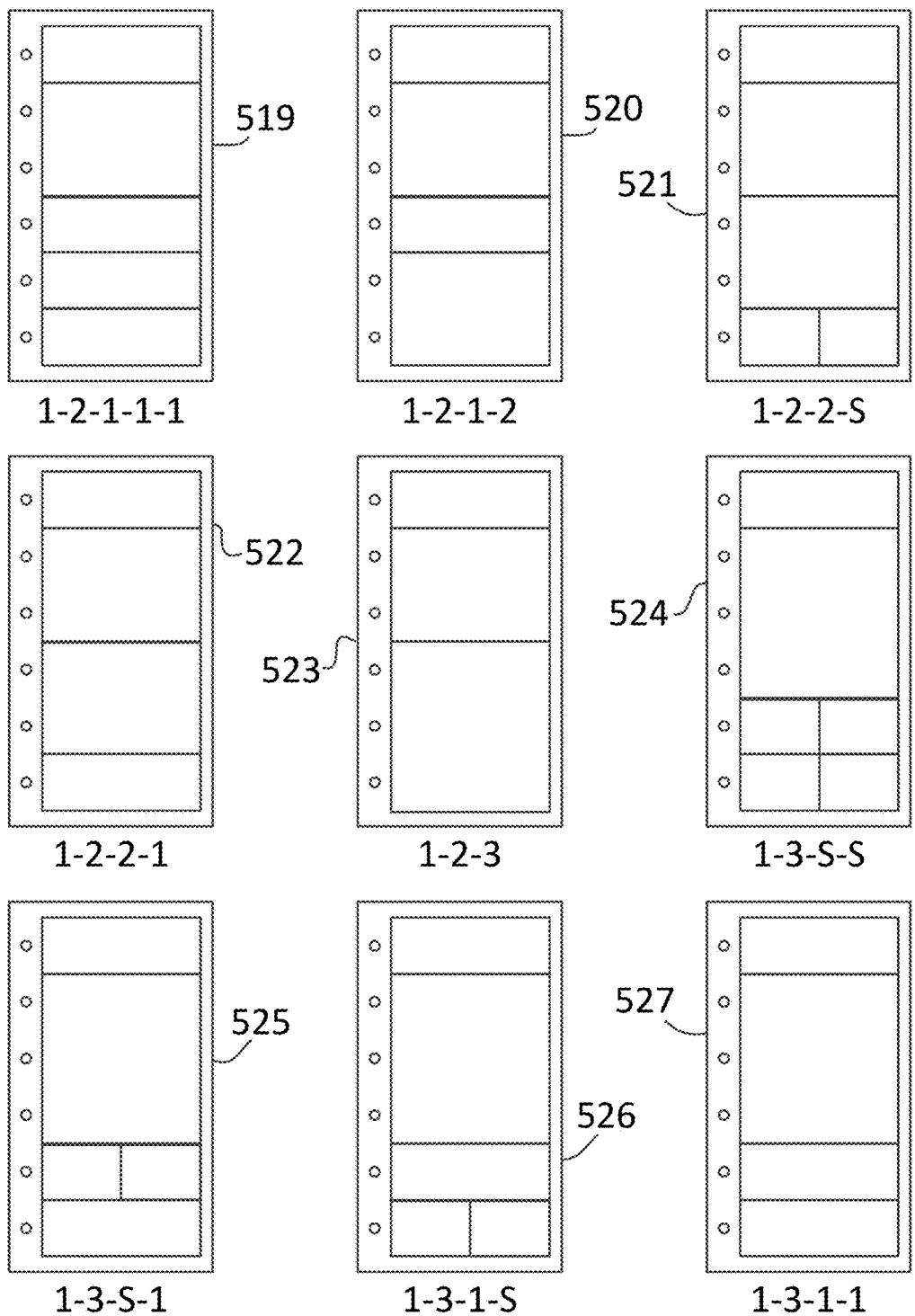
Figure 5D:
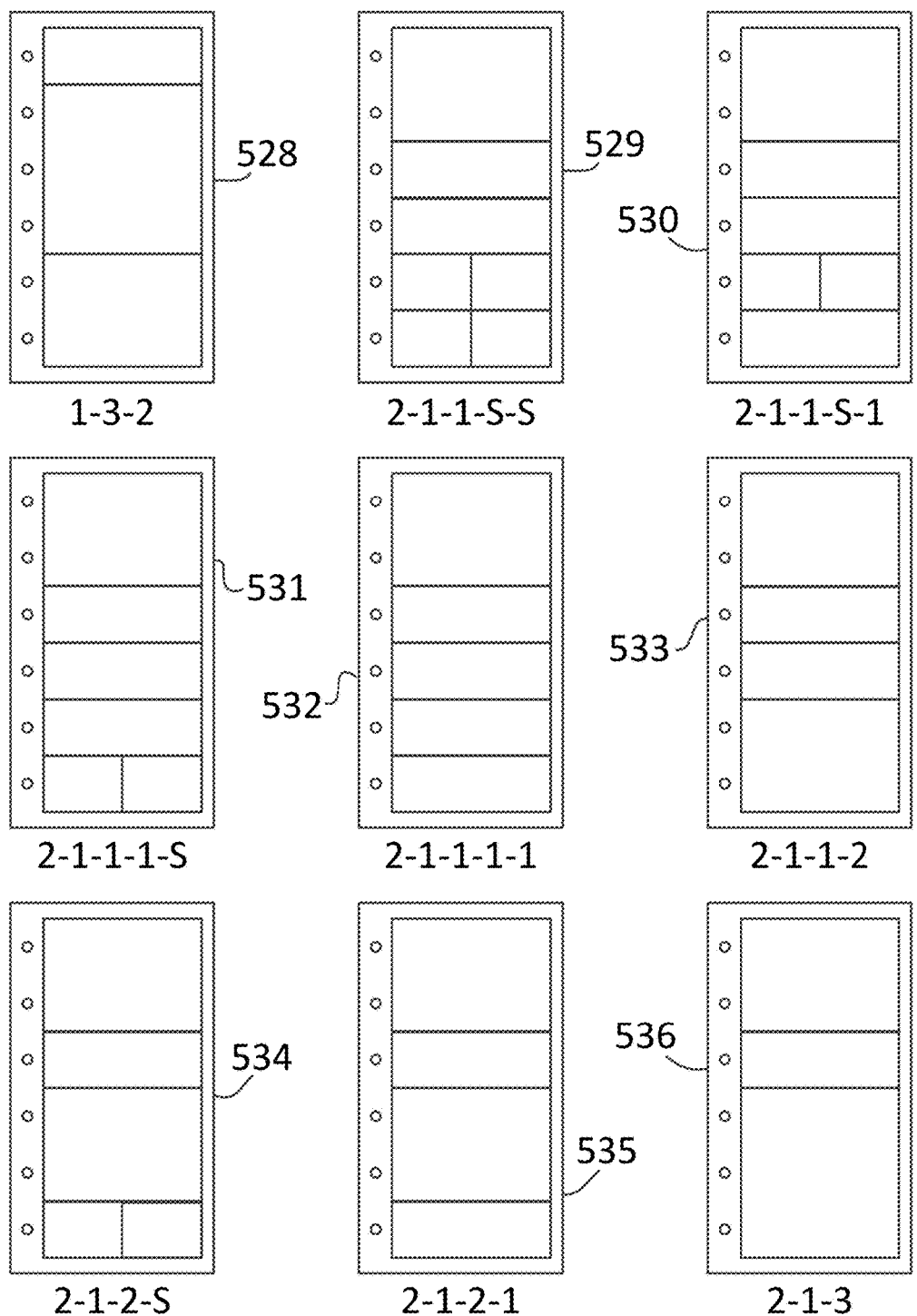
Figure 5E:
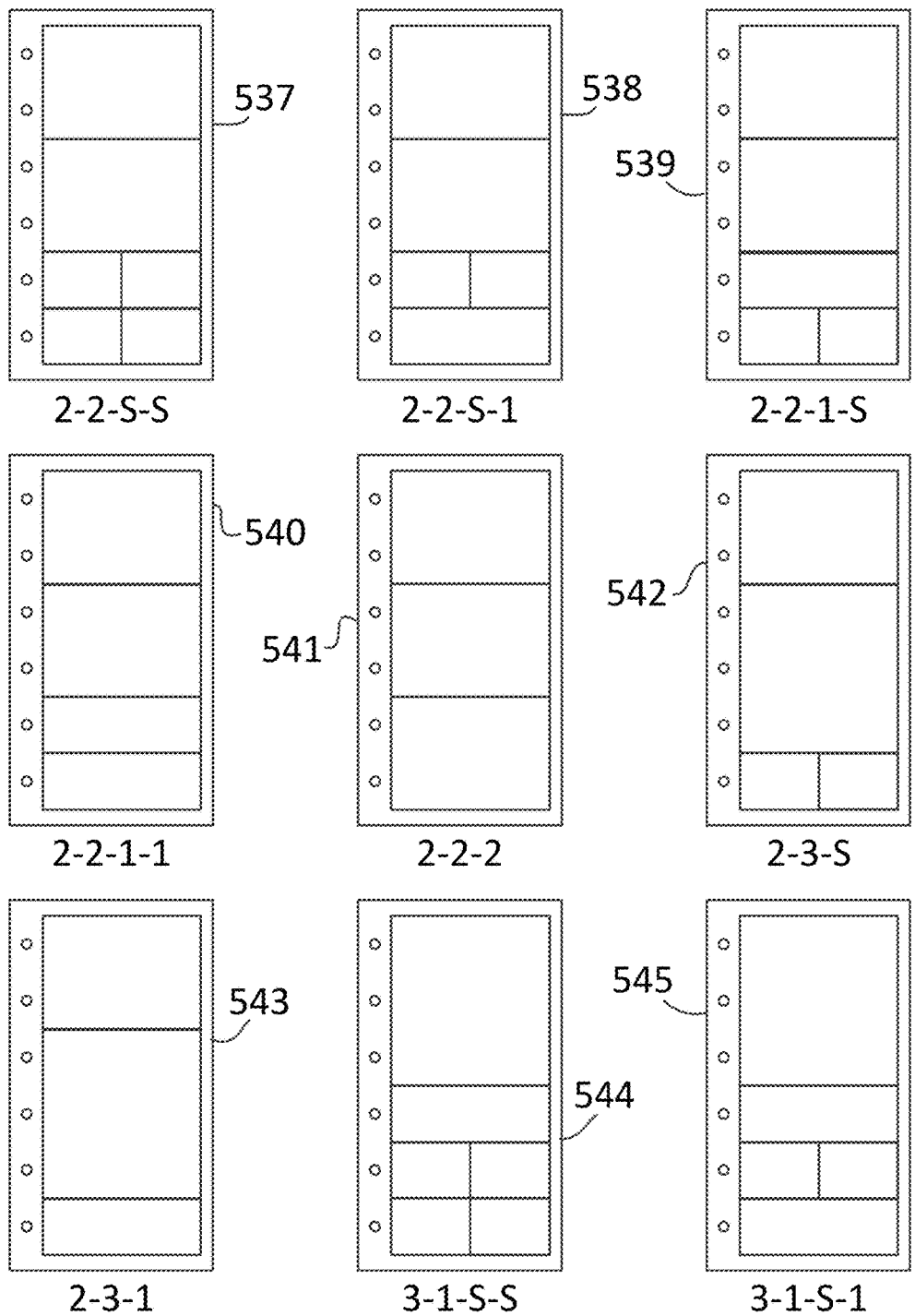
Figure 5F:
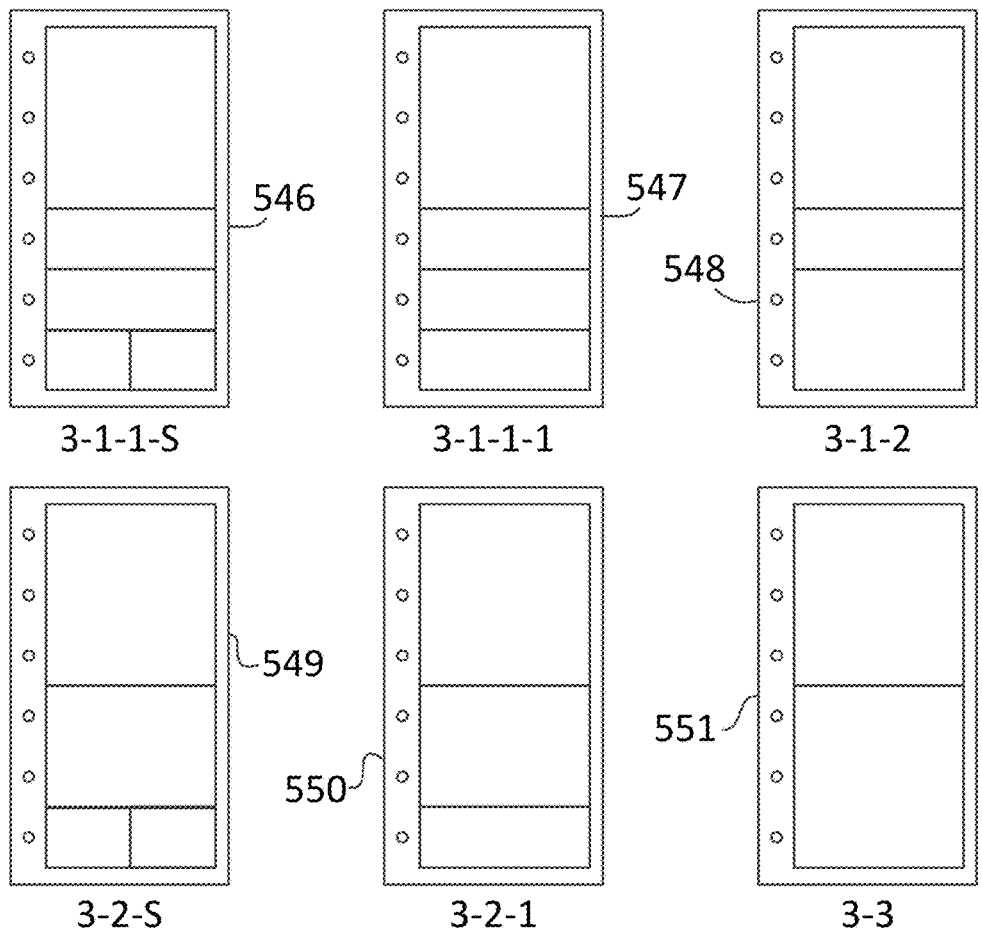

FIG. 4 is an exploded perspective view of keypad 214. Base unit 402 houses the electrical/electronic circuitry of keypad 214 (but which is not shown in great detail in FIG. 4). Buttons 222, 224 (among other types of buttons 226, 228) collectively make up a button assembly and snap to base unit 402 individually at button receiving assembly 404, such that buttons 222, 224 are operable to actuate tactile switches 420a-h mounted on button receiving assembly 404. Tactile switches 420a-h are adapted to be contacted by the buttons that cover them when the buttons are actuated, or pressed, caused a digital signal to be generated, aspects of which are discussed in greater detail below.

Buttons 222, 224, 226, 228 are adapted to mount to six respective button receivers 422a-f, as well as the receptacles shown on button receiving assembly 404 (as indicated by dashed arrow A for button 222a, and which applies to all types of buttons 222, 224, 226, and 228 according to aspects of the embodiments). The two lower most button receivers 422e,f can receive split buttons 224a-d, which actuate tactile switches 420e-h. Accordingly, a plurality of different combinations, i.e., different button configurations, can be provided on keypad 214. Double height buttons and triple height buttons cover two tactile switches and three tactile switches, respectively.

Bezel frame 312 snaps into faceplate 308 to further secure buttons 222, 224 (among others) to base unit 402 and outlet and switch (wall) box 418. Bezel frame 312 snaps into wall box 418 such that bezel frame 312 surrounds the buttons with the buttons protruding through an opening in bezel frame 312. Bezel frame 312 comprises six visual indicator openings 310a-f defined by the face of bezel frame 312 thereby providing visual access to six visual indicators 414a-f corresponding to the six vertical rows of buttons. Bezel frame 312 further includes bezel horizontal tabs 406a,b, bezel vertical tabs 410a-d, that are inserted into box horizontal tab receivers 408a,b and box vertical tab receivers 412a-d, respectively. Also part of keypad 214 is photocell 424 and photocell opening (opening) 426; opening 426 is aligned with photocell 424 such that it can monitor light levels in the area/room that keypad 214 is located, as those of skill in the art can appreciate.

According to further aspects of the embodiments, a plurality of backlights, e.g., LEDs (not shown), can be mounted on the printed circuit board or base unit 402 located immediately behind the buttons 222, 224. The backlights can illuminate buttons 222, 224, 226, 228, among others, such that text or icons that can be engraved on the buttons can be easily read in a dark room. The illumination levels of the backlights can be based on the output of photocell 424, as those of skill in the art can appreciate. Base unit 402 illuminates only the buttons that are provided on the button assembly, i.e., per the present button configuration of keypad 214, once the keypad 214 has been configured and programmed in the manner as described in greater detail below.

Keypad 214 according to further aspects of the embodiments is adapted to be mounted in a standard electrical wall box (box 418) via mounting screws and mounting holes. Faceplate 308 attaches to box 418 via screws. Faceplate 308 attaches to base unit 402 and box 418 such that bezel frame 312 and buttons 222, 224, among other types, are located in opening 416 of box 418. Faceplate 308 can be composed of a solitary component or can further comprise an adapter thereby providing a flush and screw-less aesthetic appearance.

Additionally, although not shown in FIG. 3 or 4, faceplate 308 can cover one or more unoccupied button rows thereby blanking out those unoccupied rows. In these instances, each covered row does not receive a button. These blanking faceplates 308 serve aesthetic and functional purposes by increasing the number of possible button configurations for keypad 214 according to further aspects of the embodiments.

According to further aspects of the embodiments, by employing buttons of varying sizes and blanking faceplates 308, keypad 214 can be configured with many different button configurations. Due to the large number of button configurations, the Applicants have devised a nomenclature system that will be used throughout this specification to describe button configurations of the various embodiments of the keypads. Each button is denoted with a number. Triple height buttons 228 are denoted with a "3". Double height buttons 226 are denoted with a "2". Single height buttons 222 are denoted with a 1. Split buttons 224 are denoted with an "S". Additionally, if a row is covered by a blanking faceplate 308, a "0" is listed in place of the blanked button row. So for example, a button panel comprising a double height button 226 followed by a single height button 222, a covered row, and a row of split buttons 224 is a 2-1-0-S button configuration.

Attention is now directed to FIGS. 5A-5F, and Table 1, shown below.

TABLE 1

'6-0' Cut Out, Button Patterns

| | Button Pattern | | | | | |
|---|---|---|---|---|---|---|
| Variant | a | b | c | d | e | f |
| 501 | 1 | 1 | 1 | 1 | S | S |
| 502 | 1 | 1 | 1 | 1 | S | 1 |
| 503 | 1 | 1 | 1 | 1 | 1 | S |
| 504 | 1 | 1 | 1 | 1 | 1 | 1 |
| 505 | 1 | 1 | 1 | 1 | 2 | — |
| 506 | 1 | 1 | 1 | 2 | — | S |
| 507 | 1 | 1 | 1 | 2 | — | 1 |
| 508 | 1 | 1 | 1 | 3 | — | — |
| 509 | 1 | 1 | 2 | — | S | S |
| 510 | 1 | 1 | 2 | — | S | 1 |

TABLE 1-continued

'6-0' Cut Out, Button Patterns

| | Button Pattern | | | | | |
|---|---|---|---|---|---|---|
| Variant | a | b | c | d | e | f |
| 511 | 1 | 1 | 2 | — | 1 | S |
| 512 | 1 | 1 | 2 | — | 1 | 1 |
| 513 | 1 | 1 | 2 | — | 2 | — |
| 514 | 1 | 1 | 3 | — | — | S |
| 515 | 1 | 1 | 3 | — | — | 1 |
| 516 | 1 | 2 | — | 1 | S | S |
| 517 | 1 | 2 | — | 1 | S | 1 |
| 518 | 1 | 2 | — | 1 | 1 | S |
| 519 | 1 | 2 | — | 1 | 1 | 1 |
| 520 | 1 | 2 | — | 1 | 2 | — |
| 521 | 1 | 2 | — | 2 | — | S |
| 522 | 1 | 2 | — | 2 | — | 1 |
| 523 | 1 | 2 | — | 3 | — | — |
| 524 | 1 | 3 | — | — | S | S |
| 525 | 1 | 3 | — | — | S | 1 |
| 526 | 1 | 3 | — | — | 1 | S |
| 527 | 1 | 3 | — | — | 1 | 1 |
| 528 | 1 | 3 | — | — | 2 | — |
| 529 | 2 | — | 1 | 1 | S | S |
| 530 | 2 | — | 1 | 1 | S | 1 |
| 531 | 2 | — | 1 | 1 | 1 | S |
| 532 | 2 | — | 1 | 1 | 1 | 1 |
| 533 | 2 | — | 1 | 1 | 2 | — |
| 534 | 2 | — | 1 | 2 | — | S |
| 535 | 2 | — | 1 | 2 | — | 1 |
| 536 | 2 | — | 1 | 3 | — | — |
| 537 | 2 | — | 2 | — | S | S |
| 538 | 2 | — | 2 | — | S | 1 |
| 539 | 2 | — | 2 | — | 1 | S |
| 540 | 2 | — | 2 | — | 1 | 1 |
| 541 | 2 | — | 2 | — | 2 | — |
| 542 | 2 | — | 3 | — | — | S |
| 543 | 2 | — | 3 | — | — | 1 |
| 544 | 3 | — | — | 1 | S | S |
| 545 | 3 | — | — | 1 | S | 1 |
| 546 | 3 | — | — | 1 | 1 | S |
| 547 | 3 | — | — | 1 | 1 | 1 |
| 548 | 3 | — | — | 1 | 2 | — |
| 549 | 3 | — | — | 2 | — | S |
| 550 | 3 | — | — | 2 | — | 1 |
| 551 | 3 | — | — | 3 | — | — |

Shown in FIGS. 5A-5F are 51 different variations of button configurations for keypad 214 according to aspects of the embodiments (not all configurations have been shown; e.g., different configurations (i.e., especially those with no buttons) are shown in FIGS. 6A-6F), and Table 1 above illustrates the buttons used and the rows covered by each button. Thus, for button configuration (or variant) 501, referring to FIG. 5A, there are 5 single row buttons, indicated by a "1" in rows a-d in Table 1 above, and then two rows of split buttons, indicated by an "S" in Table 1 above. A dash ("-") in Table 1 indicates that a row is covered by the button in the row or rows above it. Thus, in button configuration 507, the two row button covers row e, and in Table 1 this is shown as a dash ("-") according to aspects of the embodiments. Note that in Table 1, as FIGS. 5A-5F illustrate, there are no examples of "0" buttons, meaning there are no configurations shown where there are no buttons in a particular row, although according to aspects of the embodiments, it is the case that there can be configurations where no buttons are placed over a row; in that case, as shown in FIG. 4, base unit 402 would be configured differently and/or bezel frame 312 would be configured differently, to cover the locations where the lack of buttons would be located (or only have an opening where buttons are to be located in the case of bezel frame 312).

FIGS. 6A-F are front views of several keypads that illustrate various button configurations for controlling one or more lighting loads 204 according to aspects of the embodiments. Each keypad includes bezel frame 312, faceplate 308, and one or more buttons for controlling lighting load 204. FIG. 6A is a front view of 2-2-1-1 button configuration 602. FIG. 6B is a front view of 2-2-0-0 button configuration 604. FIG. 6C is a front view of a 3-0-0-A button configuration 606. FIG. 6D is a front view of 2-2-2 button configuration 608. FIG. 6E is a front view of 2-2-0-S button configuration 610. Finally, FIG. 6F is a front view of 3-0-S-0 button configuration 612.

2-2-1-1 button configuration 602 comprises, in descending order, a double height "ON" button 226a, a double height "OFF" button 226b, a single height "RAISE" button 222a, and a single height "LOWER" button 222b. Both first double height button 226a, and second double height button 226b have two corresponding visual indicators 414a,b, and 414c,d positioned to the left of the buttons 226a,b, and each single height button 228a,b has a single corresponding visual indicator 414e,f positioned to the left of the button 222a,b.

2-2-0-0 button configuration 604 comprises, in descending order, a double height "ON" button 226a, and a double height "OFF" button 226b. The next two rows are covered by faceplate 308. The first double height button 226a has two corresponding visual indicators 414a,b, positioned to the left of the button. The second double height button 226b has two corresponding visual indicators 414c,d, as well. The remaining two visual indicators 414e,f associated with the covered rows are covered by faceplate 308 or bezel frame 312.

3-0-0-S button configuration 606 comprises, in descending order, a triple height "ON" button 228, two covered rows, a split "raise" button 224a and a split "lower" button 224b. Triple height button 228 has three corresponding visual indicators 414a-c positioned to the left of the button. Two other visual indicators corresponding to the covered rows are covered as well. There is a single visual indicator 414d positioned to the left of the split buttons.

2-2-2 button configuration 608 comprises, in descending order, double height "ON" button 226a, double height "RAISE" button 226b, and double height "LOWER" button 226c. Each of the buttons are associated with two visual indicators 414a,b, 414c,d, and 414e,f, respectively, positioned to the left of each button.

2-2-0-S button configuration 610 comprises, in descending order, double height "ON" button 226a, double height "OFF" button 226b, split "raise" button 224a, and split "lower" button 224b. Each of the double height buttons 226a,b have two visual indicators 414a,b, and 414c,d, respectively, positioned to the left of the buttons. There is a single visual indicator 414e positioned to the left of the split key buttons 224a, b.

3-0-S-0 button configuration 612 comprises, in descending order, triple height "ON" button 228, a covered row, a pair of split key buttons 224a,b and a covered row. Triple height button 228 is associated with three visual indicators 414a-c positioned to the left of button 228. The pair of split key buttons 224a,b are associated with a single visual indicator 414d positioned to the left of the buttons.

According to aspects of the embodiments, some button functions correspond to lighting controls, e.g., on/off controls or brighten/dim controls, and some button functions correspond to shade controls, e.g., raise/lower controls, and some can be used for other devices such as audio (raise volume, lower volume), among other devices and their respective controls. However, as those of skill in the art can now appreciate, the button functions should not be limited to these functions or to solely lighting/shading/audio applications. Buttons can be programmed as scene buttons corresponding to a lighting/shading/audio configurations for a plurality of scenarios (or scenes). For example, a "morning" scene could be open all the shades, turn down the lights, and set the audio to low levels (and quiet, comforting music). As discussed above, keypad 214, among others, can also control one or more window coverings or a combination of lighting loads 204 and motorized roller shades 206. Additionally, various electronic devices, such as security system devices, or audio visual devices, among other types of electronic devices or systems, can be associated with a particular scene or be independently controlled by keypad 214, among other types of keypads.

FIG. 7 illustrates circuit schematic (circuit) 700 that can be used with (as a component of) keypad 214 described above, as well as load control device 210. Circuit 700 interfaces with base unit 402 (and the buttons and visual indicators located thereon), as well as load control device 210. That is, part of or all of circuit 700 can comprise the circuitry of keypad 214 (and other keypads), as well as load control device 210. Circuit 700 comprises controller 702, which can be implemented as a microprocessor, but can also be any other suitable processing device, such as, for example, a microcontroller, a programmable logic device (PLD), or an application specific integrated circuit (ASIC), as well as discrete circuit components, or even transistors. Circuit 700 is coupled to four-wire communication link 212 via four-position connector 718. Power supply 712 draws current from one of the conductors of the communication link 212 via connector 718 and generates a direct-current (DC) voltage $V_{CC}$ for powering controller 702 and the other low-voltage circuitry of the keypad.

According to aspects of the embodiments, communication circuit 704 can be an RS-485 transceiver, and is coupled to first data wire MUX 716 and second data wire MUXBAR 714 of communication link 212, and carries differential signals according to the RS-485 protocol. Controller 702 is coupled to communication circuit 704, such that controller 702 is operable, adapted, and configured to transmit and receive digital messages via communication link 212. Controller 702 also receives inputs from a plurality of buttons 224, 226, 228, and controls a plurality of LEDs/visual indicators 414. Controller 702 is further coupled to memory 706 for storage of the template and configuration information, which defines, in part, the use of buttons 708, and visual indicators 414. Controller 702 is further adapted to output audio information to speakers 722 (if so equipped) and receive audio information received from microphone 724. According to further aspects of the embodiments, controller 702 can also transmit/receive data to/from display 708 (which can be a touch panel capacitive-type display (not shown in the Figures).

According to aspects of the embodiments, circuit 700 is operable to change the programmed button template and configuration in response to inputs provided to controller 702 for use with any of the aforementioned keypads, from the buttons. Specifically, circuit 700 is operable to change the button configuration in response to a user placing the keypad in a configuration mode and actuating the keypad buttons in a predefined sequence according to aspects of the embodiments, and is further operable/adapted/configured to change the button template in response to a user placing the keypad in a template-change mode and actuating the keypad buttons in a predefined sequence according to aspects of the embodiments.

According to further aspects of the embodiments, since the method described herein does not rely on the position of the top and bottom button to detect the button configuration, an increased number of button configurations can be employed. For example, two different button configurations can have the same top and bottom button positions and still be detected as distinct by the keypad. Additionally, because the number of predefined sequences that can be utilized is limited only by practicality, the method allows for configuration of button functionality as well as configurations comprising buttons with non-uniform height and width according to further aspects of the embodiments.

Figure 8:
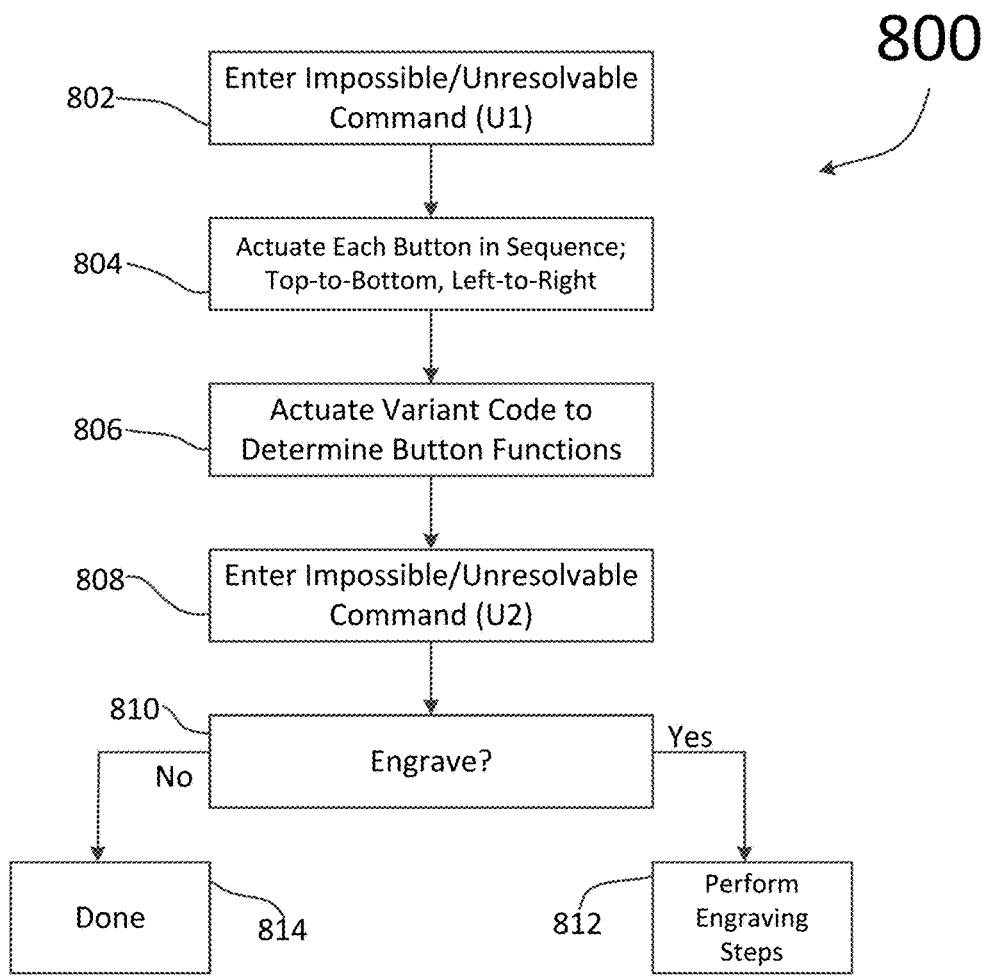
FIG. 8 is a flow chart of a method for configuring and programming a four or six row keypad, among other types, according to aspects of the embodiments.

FIG. 8 is a flowchart of method 800 for configuring buttons of a keypad for use with load control system 200 according to aspects of the embodiments. Method 800 can be used with any of the keypads described herein according to aspects of the embodiments, and provides for convenient configuration and programming of keypad 214 by enabling configuration through actuations of the keypad buttons. However, prior to beginning the discussion of FIG. 8 and method 800, a description of the generation of impossible or "unresolvable" codes will be presented, and in addition generation of "variant codes," the former of which are used to put the controller of LCS 200 on notice that a user is configuring keypad 214 (configuring tells the controller which button configuration or layout is on keypad 214), and the latter of which is used within the programming/configuring method to tell the controller what the buttons should be programmed to do (based on engraving or other documentation that shows the button layout and its desired functionality). Attention is now directed to Table 2, shown below.

TABLE 2

Command Words

| Button Type/ Position | Switches (Command Word Bit Pattern) | | | | | | | | hex |
|---|---|---|---|---|---|---|---|---|---|
| | A | B | C | D | E | F | G | H | |
| 1/a | 1 | 0 | 0 | 0 | 0 | 0 | 0 | 0 | 80h |
| 1/b | 0 | 1 | 0 | 0 | 0 | 0 | 0 | 0 | 40h |
| 1/c | 0 | 0 | 1 | 0 | 0 | 0 | 0 | 0 | 20h |
| 1/d | 0 | 0 | 0 | 1 | 0 | 0 | 0 | 0 | 10h |
| 1/e | 0 | 0 | 0 | 0 | 1 | 0 | 1 | 0 | 0Ah |
| 1/f | 0 | 0 | 0 | 0 | 0 | 1 | 0 | 1 | 05h |
| 2/a | 1 | 1 | 0 | 0 | 0 | 0 | 0 | 0 | C0h |
| 2/b | 0 | 1 | 1 | 0 | 0 | 0 | 0 | 0 | 60h |
| 2/c | 0 | 0 | 1 | 1 | 0 | 0 | 0 | 0 | 30h |
| 2/d | 0 | 0 | 0 | 1 | 1 | 0 | 0 | 0 | 18h |
| 2/e | 0 | 0 | 0 | 0 | 1 | 1 | 0 | 0 | 0Ch |
| 3/a | 1 | 1 | 1 | 0 | 0 | 0 | 0 | 0 | E0h |
| 3/b | 0 | 1 | 1 | 1 | 0 | 0 | 0 | 0 | 70h |
| 3/c | 0 | 0 | 1 | 1 | 1 | 0 | 0 | 0 | 38h |
| 3/d | 0 | 0 | 0 | 1 | 1 | 1 | 0 | 0 | 1Ch |
| S/e (left) | 0 | 0 | 0 | 0 | 1 | 0 | 0 | 0 | 08h |
| S/e (right) | 0 | 0 | 0 | 0 | 0 | 0 | 1 | 0 | 02h |
| S/f (left) | 0 | 0 | 0 | 0 | 0 | 1 | 0 | 0 | 04h |
| S/f (right) | 0 | 0 | 0 | 0 | 0 | 0 | 0 | 1 | 01h |

According to aspects of the embodiments, each button only includes a single tab and thus activates only a single switch when depressed. One skilled in the art will recognize that these 'single tab' buttons can be co-mixed with the 'multiple tab' buttons listed in Table 2, above. Table 3 shows an embodiment where the switches that are depressed by a 'single' table button in an upper left corner of the button. One skilled in the art will recognize that in other embodiments, such a 'single tab' could be located in the upper left corner of the button or other positions depending on the physical configuration of the switches.

TABLE 3

Alternate Command Words

| Button Type/ Position | Switches (Command Word Bit Pattern) | | | | | | | | hex |
|---|---|---|---|---|---|---|---|---|---|
| | A | B | C | D | E | F | G | H | |
| 1/a | 1 | 0 | 0 | 0 | 0 | 0 | 0 | 0 | 80h |
| 1/b | 0 | 1 | 0 | 0 | 0 | 0 | 0 | 0 | 40h |
| 1/c | 0 | 0 | 1 | 0 | 0 | 0 | 0 | 0 | 20h |
| 1/d | 0 | 0 | 0 | 1 | 0 | 0 | 0 | 0 | 10h |
| 1/e (alt) | 0 | 0 | 0 | 0 | 1 | 0 | 0 | 0 | 08h |
| 1/f (alt) | 0 | 0 | 0 | 0 | 0 | 1 | 0 | 0 | 04h |
| 2/a (alt) | 1 | 0 | 0 | 0 | 0 | 0 | 0 | 0 | 80h |
| 2/b (alt) | 0 | 1 | 0 | 0 | 0 | 0 | 0 | 0 | 40h |
| 2/c (alt) | 0 | 0 | 1 | 0 | 0 | 0 | 0 | 0 | 20h |
| 2/d (alt) | 0 | 0 | 0 | 1 | 0 | 0 | 0 | 0 | 10h |
| 2/e (alt) | 0 | 0 | 0 | 0 | 1 | 0 | 0 | 0 | 08h |
| 3/a (alt) | 1 | 0 | 0 | 0 | 0 | 0 | 0 | 0 | 80h |
| 3/b (alt) | 0 | 1 | 0 | 0 | 0 | 0 | 0 | 0 | 40h |
| 3/c (alt) | 0 | 0 | 1 | 0 | 0 | 0 | 0 | 0 | 20h |
| 3/d (alt) | 0 | 0 | 0 | 1 | 0 | 0 | 0 | 0 | 10h |
| S/e (left) | 0 | 0 | 0 | 0 | 1 | 0 | 0 | 0 | 08h |
| S/e (right) | 0 | 0 | 0 | 0 | 0 | 0 | 1 | 0 | 02h |
| S/f (left) | 0 | 0 | 0 | 0 | 0 | 1 | 0 | 0 | 04h |
| S/f (right) | 0 | 0 | 0 | 0 | 0 | 0 | 0 | 1 | 01h |

Note that in the embodiment being described above in Table 3, the command word for the button type/position '1/e' is the same as that for 'S/e (left)' and the command word for the button type/position '1/f' is the same as that for 'S/f (left)'. The button configuration is resolvable because the pattern signature, described below, requires the depression of all keys.

Figure 9:
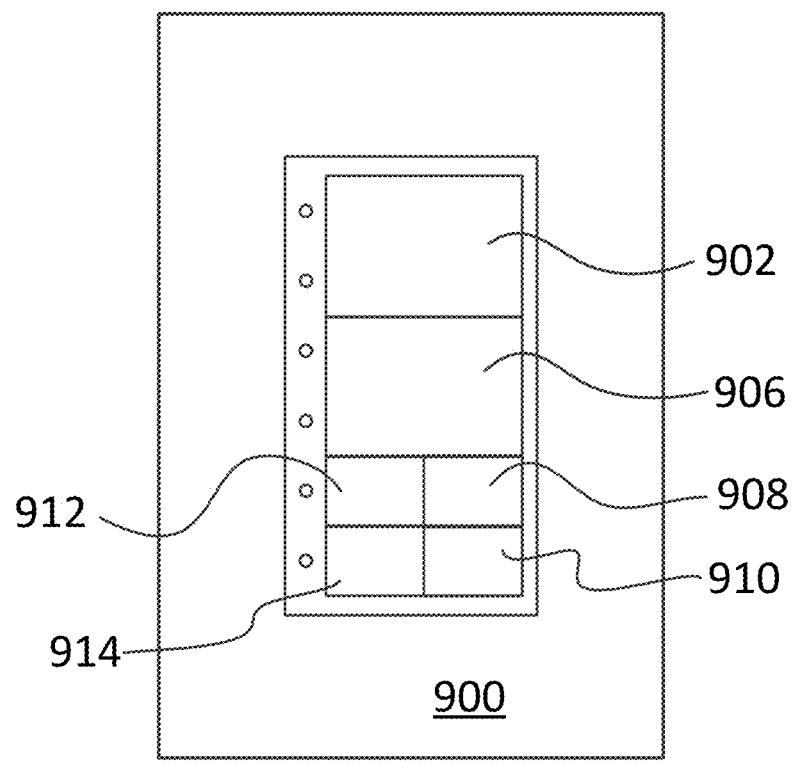
FIG. 9 illustrates an 2-2-S-S keypad according to aspects of the embodiments.

Attention is now directed to FIG. 9. In FIG. 9, when a user depresses certain pairs of keys simultaneously, the resulting command word bit pattern does not correspond to any single valid keypress that can be generated with any of the following buttons: (a) single-height full-width, (b) single-height split, (c) double-height, or (d) triple-height, regardless of installation position. The resulting command word for such a simultaneous double depression is an unresolvable command (U) that advantageously can be used as an 'escape sequence' that allows for programming options. For example, simultaneous depression of button 902, a double-height button in position a (2/a) and button 914, the left half of a split single-height button in position f (S/f (left)) will result in an unresolvable command (C4h). Table 4, shown below, illustrates all the valid command words and 'unresolvable combinations' (U) for the default and alternate command words shown in Tables 2 and 3, above.

TABLE 4

Command Word Codes

| hex | Command Word Description |
|---|---|
| 00h | Null - not used |
| 01h | S/f (right) |
| 02h | S/e (right) |
| 03h | unresolvable |
| 04h | S/f (left), or 1/f (alt) |
| 05h | 1/f |
| 06h-07h | unresolvable |
| 08h | S/e (left), 1/e (alt) or 2/e (alt) |

TABLE 4-continued

Command Word Codes

| hex | Command Word Description |
|---|---|
| 09h | unresolvable |
| 0Ah | 1/e |
| 0Bh | unresolvable |
| 0Ch | 2/e |
| 0Dh-0Fh | unresolvable |
| 10h | 1/d, 2/d (alt), or 3/d (alt) |
| 11h-17h | unresolvable |
| 18h | 2/d |
| 19h-1Bh | unresolvable |
| 1Ch | 3/d |
| 1Dh-1Fh | unresolvable |
| 20h | 1/c, 2/c (alt), or 3/c (alt) |
| 21h-2Fh | unresolvable |
| 30h | 2/c |
| 31h-37h | unresolvable |
| 38h | 3/c |
| 39h-3Fh | unresolvable |
| 40h | 1/b, 2/b (alt), or 3/b (alt) |
| 41h-5Fh | unresolvable |
| 60h | 2/b |
| 61h-6Fh | unresolvable |
| 70h | 3/b |
| 71h-7Fh | unresolvable |
| 80h | 1/a, 2/a (alt), or 3/a (alt) |
| 81h-BFh | unresolvable |
| C0h | 2/a |
| C1h-DFh | unresolvable |
| E0h | 3/a |
| E1h-FFh | unresolvable |

Table 5 shows the button pattern signatures for the command words shown in Table 2, above, where the signature is started (step 802, discussed below in regard to FIG. 8 and method 800) and terminated (step 806, discussed below in regard to FIG. 8 and method 800) by an unresolvable command word (U) and the buttons are depressed in a top-down order, with left right order for each split, and the buttons are only depressed once while forming the signature (normal order).

TABLE 5

'6-0' Cut Out, Pattern Signatures

| Variant | Pattern | Signature - Normal Order |
|---|---|---|
| 501 | 1-1-1-1-S-S | U, 80h, 40h, 20h, 10h, 08h, 02h, 04h, 01h, U |
| 502 | 1-1-1-1-S-1 | U, 80h, 40h, 20h, 10h, 08h, 02h, 05h, U |
| 503 | 1-1-1-1-1-S | U, 80h, 40h, 20h, 10h, 0Ah, 08h, 01h, U |
| 504 | 1-1-1-1-1-1 | U, 80h, 40h, 20h, 10h, 0Ah, 05h, U |
| 505 | 1-1-1-1-2 | U, 80h, 40h, 20h, 10h, 0Ch, U |
| 506 | 1-1-1-2-S | U, 80h, 40h, 20h, 18h, 08h, 01h, U |
| 507 | 1-1-1-2-1 | U, 80h, 40h, 20h, 18h, 05h, U |
| 508 | 1-1-1-3 | U, 80h, 40h, 20h, 1Ch, U |
| 509 | 1-1-2-S-S | U, 80h, 40h, 30h, 08h, 02h, 08h, 01h, U |
| 510 | 1-1-2-S-1 | U, 80h, 40h, 30h, 08h, 02h, 05h, U |
| 511 | 1-1-2-1-S | U, 80h, 40h, 30h, 0Ah, 08h, 01h, U |
| 512 | 1-1-2-1-1 | U, 80h, 40h, 30h, 0Ah, 05h, U |
| 513 | 1-1-2-2 | U, 80h, 40h, 30h, 0Ch, U |
| 514 | 1-1-3-S | U, 80h, 40h, 38h, 08h, 01h, U |
| 515 | 1-1-3-1 | U, 80h, 40h, 38h, 05h, U |
| 516 | 1-2-1-S-S | U, 80h, 60h, 10h, 08h, 02h, 08h, 01h, U |
| 517 | 1-2-1-S-1 | U, 80h, 60h, 10h, 08h, 02h, 05h, U |
| 518 | 1-2-1-1-S | U, 80h, 60h, 10h, 0Ah, 08h, 01h, U |
| 519 | 1-2-1-1-1 | U, 80h, 60h, 10h, 0Ah, 05h, U |
| 520 | 1-2-1-2 | U, 80h, 60h, 10h, 0Ch, U |
| 521 | 1-2-2-S | U, 80h, 60h, 18h, 08h, 01h, U |
| 522 | 1-2-2-1 | U, 80h, 60h, 18h, 05h, U |
| 523 | 1-2-3 | U, 80h, 60h, 1Ch, U |
| 524 | 1-3-S-S | U, 80h, 70h, 08h, 02h, 08h, 01h, U |
| 525 | 1-3-S-1 | U, 80h, 70h, 08h, 02h, 05h, U |
| 526 | 1-3-1-S | U, 80h, 70h, 0Ah, 08h, 01h, U |
| 527 | 1-3-1-1 | U, 80h, 70h, 0Ah, 05h, U |
| 528 | 1-3-2 | U, 80h, 70h, 0Ch, U |
| 529 | 2-1-1-S-S | U, C0h, 20h, 10h, 08h, 02h, 08h, 01h, U |
| 530 | 2-1-1-S-1 | U, C0h, 20h, 10h, 08h, 02h, 05h, U |
| 531 | 2-1-1-1-S | U, C0h, 20h, 10h, 0Ah, 08h, 01h, U |
| 532 | 2-1-1-1-1 | U, C0h, 20h, 10h, 0Ah, 05h, U |
| 533 | 2-1-1-2 | U, C0h, 20h, 10h, 0Ch, U |
| 534 | 2-1-2-S | U, C0h, 20h, 18h, 08h, 01h, U |
| 535 | 2-1-2-1 | U, C0h, 20h, 18h, 05h, U |
| 536 | 2-1-3 | U, C0h, 20h, 1Ch, U |
| 537 | 2-2-S-S | U, C0h, 30h, 08h, 02h, 08h, 01h, U |
| 538 | 2-2-S-1 | U, C0h, 30h, 08h, 02h, 05h, U |
| 539 | 2-2-1-S | U, C0h, 30h, 0Ah, 08h, 01h, U |
| 540 | 2-2-1-1 | U, C0h, 30h, 0Ah, 05h, U |
| 541 | 2-2 | U, C0h, 30h, 0Ch, U |
| 542 | 2-3-S | U, C0h, 38h, 08h, 01h, U |
| 543 | 2-3-1 | U, C0h, 38h, 05h, U |
| 544 | 3-1-S-S | U, E0h, 10h, 08h, 02h, 08h, 01h, U |
| 545 | 3-1-S-1 | U, E0h, 10h, 08h, 02h, 05h, U |
| 546 | 3-1-1-S | U, E0h, 10h, 0Ah, 08h, 01h, U |
| 547 | 3-1-1-1 | U, E0h, 10h, 0Ah, 05h, U |
| 548 | 3-1-2 | U, E0h, 10h, 0Ch, U |
| 549 | 3-2-S | U, E0h, 18h, 08h, 01h, U |
| 550 | 3-2-1 | U, E0h, 18h, 05h, U |
| 551 | 3-3 | U, E0h, 1Ch, U |

Table 6 shows the button pattern signatures for the alternate command words shown in Table 3, above, where the signature is started and terminated by an unresolvable command word (U) and the buttons are depressed in a top-down order, with left-to-right order for each split, and the buttons are only depressed once while forming the signature (normal order).

TABLE 6

'6-0' Cut Out, Pattern Alternate Signatures

| Variant | Pattern | Alternate Signature - Normal Order |
|---|---|---|
| 501 | 1-1-1-1-S-S | U, 80h, 40h, 20h, 10h, 08h, 02h, 04h, 01h, U |
| 502 | 1-1-1-1-S-1 | U, 80h, 40h, 20h, 10h, 08h, 02h, 04h, U |
| 503 | 1-1-1-1-1-S | U, 80h, 40h, 20h, 10h, 08h, 04h, 01h, U |
| 504 | 1-1-1-1-1-1 | U, 80h, 40h, 20h, 10h, 08h, 04h, U |
| 505 | 1-1-1-1-2 | U, 80h, 40h, 20h, 10h, 08h, U |
| 506 | 1-1-1-2-S | U, 80h, 40h, 20h, 10h, 04h, 01h, U |
| 507 | 1-1-1-2-1 | U, 80h, 40h, 20h, 10h, 04h, U |
| 508 | 1-1-1-3 | U, 80h, 40h, 20h, 10h, U |
| 509 | 1-1-2-S-S | U, 80h, 40h, 20h, 08h, 02h, 04h, 01h, U |
| 510 | 1-1-2-S-1 | U, 80h, 40h, 20h, 08h, 02h, 04h, U |
| 511 | 1-1-2-1-S | U, 80h, 40h, 20h, 08h, 04h, 01h, U |
| 512 | 1-1-2-1-1 | U, 80h, 40h, 20h, 08h, 04h, U |
| 513 | 1-1-2-2 | U, 80h, 40h, 20h, 08h, U |
| 514 | 1-1-3-S | U, 80h, 40h, 20h, 04h, 01h, U |
| 515 | 1-1-3-1 | U, 80h, 40h, 20h, 04h, U |
| 516 | 1-2-1-S-S | U, 80h, 40h, 10h, 08h, 02h, 04h, 01h, U |
| 517 | 1-2-1-S-1 | U, 80h, 40h, 10h, 08h, 02h, 04h, U |
| 518 | 1-2-1-1-S | U, 80h, 40h, 10h, 08h, 04h, 01h, U |
| 519 | 1-2-1-1-1 | U, 80h, 40h, 10h, 08h, 04h, U |
| 520 | 1-2-1-2 | U, 80h, 40h, 10h, 08h, U |
| 521 | 1-2-2-S | U, 80h, 40h, 10h, 04h, 01h, U |
| 522 | 1-2-2-1 | U, 80h, 40h, 10h, 04h, U |
| 523 | 1-2-3 | U, 80h, 40h, 10h, U |
| 524 | 1-3-S-S | U, 80h, 40h, 08h, 02h, 04h, 01h, U |
| 525 | 1-3-S-1 | U, 80h, 40h, 08h, 02h, 04h, U |
| 526 | 1-3-1-S | U, 80h, 40h, 08h, 04h, 01h, U |
| 527 | 1-3-1-1 | U, 80h, 40h, 08h, 04h, U |
| 528 | 1-3-2 | U, 80h, 40h, 08h, U |
| 529 | 2-1-1-S-S | U, 80h, 20h, 10h, 08h, 02h, 04h, 01h, U |
| 530 | 2-1-1-S-1 | U, 80h, 20h, 10h, 08h, 02h, 04h, U |
| 531 | 2-1-1-1-S | U, 80h, 20h, 10h, 08h, 04h, 01h, U |
| 532 | 2-1-1-1-1 | U, 80h, 20h, 10h, 08h, 04h, U |
| 533 | 2-1-1-2 | U, 80h, 20h, 10h, 08h, U |
| 534 | 2-1-2-S | U, 80h, 20h, 10h, 04h, 01h, U |

TABLE 6-continued

'6-0' Cut Out, Pattern Alternate Signatures

| Variant | Pattern | Alternate Signature - Normal Order |
|---|---|---|
| 535 | 2-1-2-1 | U, 80h, 20h, 10h, 04h, U |
| 536 | 2-1-3 | U, 80h, 20h, 10h, U |
| 537 | 2-2-S-S | U, 80h, 20h, 08h, 02h, 04h, 01h, U |
| 538 | 2-2-S-1 | U, 80h, 20h, 08h, 02h, 04h, U |
| 539 | 2-2-1-S | U, 80h, 20h, 08h, 04h, 01h, U |
| 540 | 2-2-1-1 | U, 80h, 20h, 08h, 04h, U |
| 541 | 2-2-2 | U, 80h, 20h, 08h, U |
| 542 | 2-3-S | U, 80h, 20h, 04h, 01h, U |
| 543 | 2-3-1 | U, 80h, 20h, 04h, U |
| 544 | 3-1-S-S | U, 80h, 10h, 08h, 02h, 04h, 01h, U |
| 545 | 3-1-S-1 | U, 80h, 10h, 08h, 02h, 04h, U |
| 546 | 3-1-1-S | U, 80h, 10h, 08h, 04h, 01h, U |
| 547 | 3-1-1-1 | U, 80h, 10h, 08h, 04h, U |
| 548 | 3-1-2 | U, 80h, 10h, 08h, U |
| 549 | 3-2-S | U, 80h, 10h, 04h, 01h, U |
| 550 | 3-2-1 | U, 80h, 10h, 04h, U |
| 551 | 3-3 | U, 80h, 10h, U |

According to further aspects of the embodiments, each button pattern signature only requires that the each button is depressed once; a button pattern layout can still be determined even when the buttons are depressed in an arbitrary order, as long the complete set of buttons has been depressed, and even if buttons are depressed more than once.

Therefore, the button pattern can be determined when the buttons are depressed in normal order and according to aspects of the embodiments, and as described below and in regard to Method 800 shown in FIG. 8, this is used to identify the button layout only (i.e. blank buttons). For example, the following key depression signature sequence defines a 2-2-S-S keypad 900 with button pattern variant 137 (2-2-S-S) as shown in FIG. 9, with blank button caps: (1) buttons 902 and 912 together (unresolvable; method 800 method step 802), (2) button 902, (3) button 904, (4) button 910, (5) button 906, (6) button 912, (7) button 908 (method 800 method step 804), and (8) buttons 902 and 912 together (unresolvable; method 800 method step 808). This button sequence corresponds to the following 'pattern signatures'.

Basic (Table 5): "U, C0h, 30h, 08h, 02h, 08h, 01h, U"
Alternate (Table 6): "U, 80h, 20h, 08h, 02h, 04h, 01h, U"

When the buttons are depressed in a non-normal sequence or when additional buttons are depressed (method 800 method step 806, described below), this additional information can be used to identify predetermined button layout and button functions (i.e., engraving on each button cap). For example according to one embodiment, the signature for the specific button configuration of keypad 900, shown in FIG. 9 includes an extra depression of button 902 at the end of the depression sequence, but before the final unresolvable command: (1) buttons 902 and 912 together (unresolvable, step 802); (2) button 902 (first time), (3) button 904, (4) button 910, (5) button 906, (6) button 912, (7) button 908 (method step 804); (8) button 902 (second time; method step 806); and (9) buttons 902 and 912 together (unresolvable; method step 808). This button sequence corresponds to the following 'pattern signatures'.

Basic: "U, C0h, 30h, 08h, 02h, 08h, 01h, U"
Alternate: "U, 80h, 20h, 08h, 02h, 04h, 01h, U"

Therefore, by either adding key depressions and/or changing the key depression order, multiple configurations can be defined. In the present embodiments, the preferred approach is to use the normal signature order and append multiple key depressions of the first button (Y) and second button (Z) to end of the signature just before the closing unresolvable command (U) as follows:

$U_1$ (step 802), X (step 804), Y and/or Z [which are the appended key depressions or "variant code"; step 806)], $U_2$ (step 808).

If there are no appended key depressions, then a default 'all-blank' button configuration exists. When there are appended key depressions then a predetermined engraved button configuration exists. The binary-like numbering scheme for the first fourteen configuration suffixes is shown in Table 7.

TABLE 7

Configuration Suffixes; "Variant Code"

| Suffix | binary | Appended Key Depressions |
|---|---|---|
| '0' or none | — | none |
| '1' | 0 | Y |
| '2' | 1 | Z |
| '3' | 00 | Y-Y |
| '4' | 01 | Y-Z |
| '5' | 10 | Z-Y |
| '6' | 11 | Z-Z |
| '7' | 000 | Y-Y-Y |
| '8' | 001 | Y-Y-Z |
| '9' | 010 | Y-Z-Y |
| '10' | 011 | Y-Z-Z |
| '11' | 100 | Z-Y-Y |
| '12' | 101 | Z-Y-Z |
| '13' | 110 | Z-Z-Y |
| '14' | 111 | Z-Z-Z |

Figure 10:
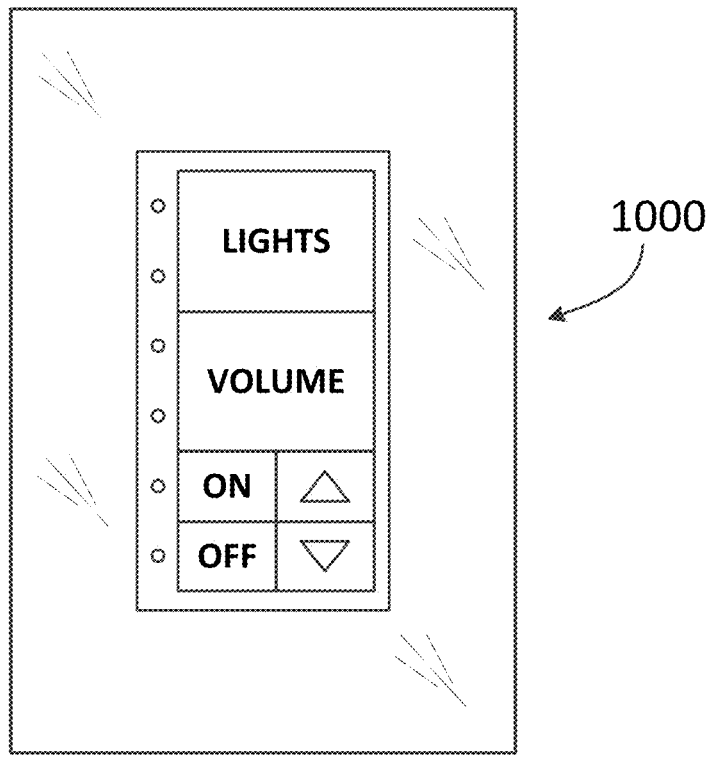
FIG. 10 illustrates another example of a 2-2-S-S keypad according to aspects of the embodiments.

Referring now to FIG. 10, as described above, button configuration 1000 can be described by variant-suffix as "137-1", by short pattern-suffix as "2-2-S-S (1)," or by short-pattern and engraving as "2-2-S-S ("LIGHTS", "VOLUME", "ON", "&up", "OFF", &down")" according to aspects of the embodiments. Certain other predefined configurations, for a '6-0 cutout' are shown in FIG. 10 and listed below in Table 8. See http://www.crestron.com/products/model/C2N-CBD-E and FIG. 6D of U.S. Provisional Patent Application Ser. No. 62/164,860, filed 21 May 2015, to which the present application claims priority to.

TABLE 8

Figure 11:
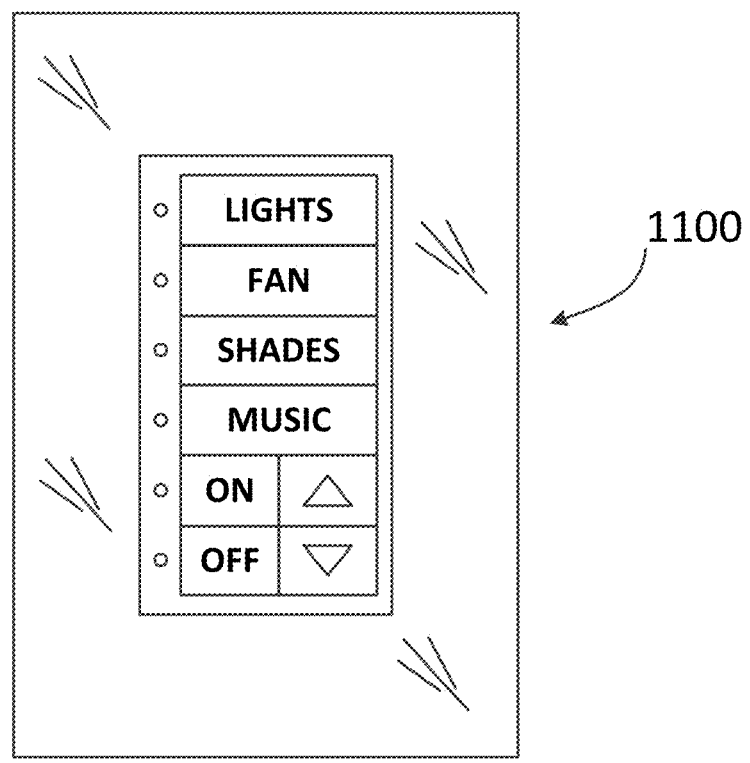
FIG. 11 illustrates a 1-1-1-1-S-S keypad according to aspects of the embodiments.
Figure 12:
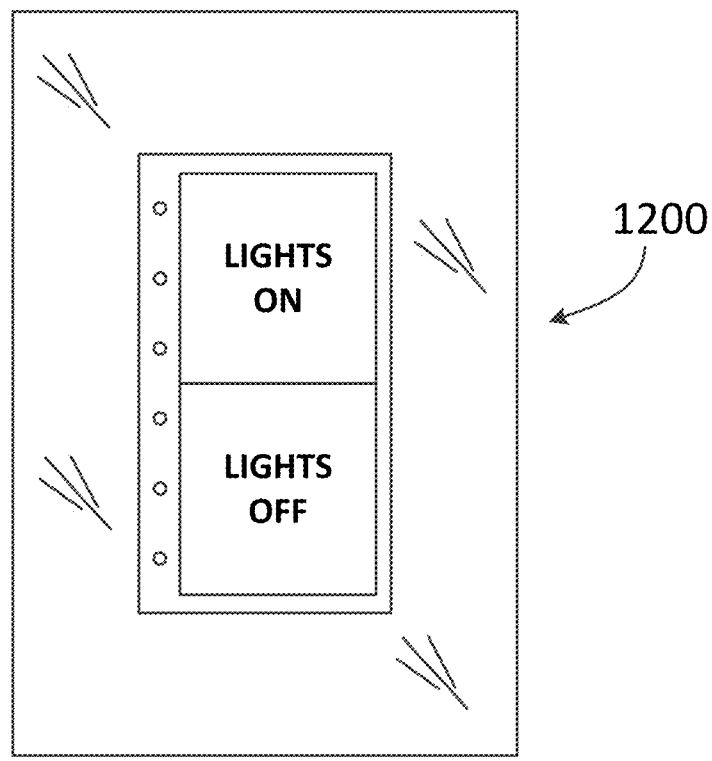
FIG. 12 illustrates a 3-3 keypad according to aspects of the embodiments.
Figure 13:
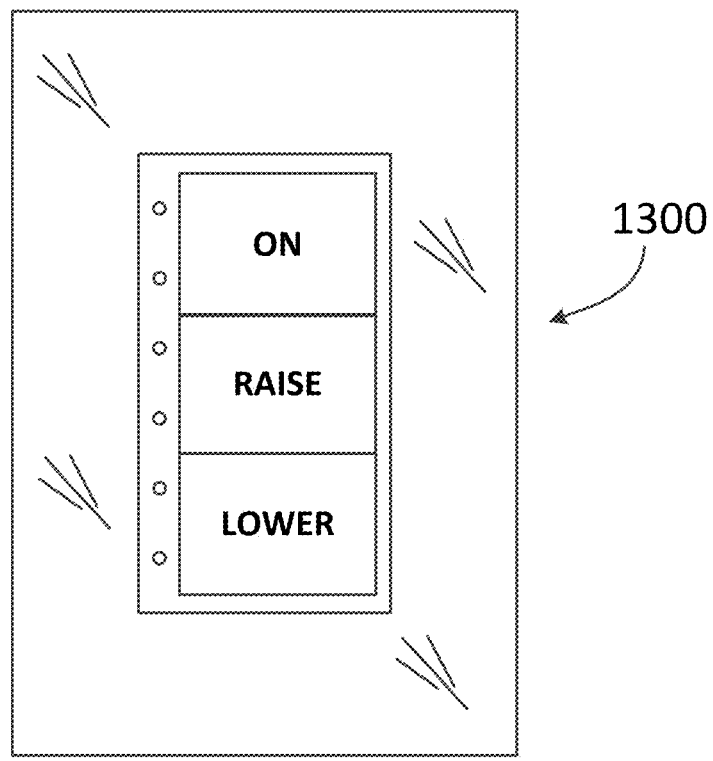
FIG. 13 illustrates a 2-2-2 keypad according to aspects of the embodiments.

| Ref Char | Variant-Suffix | Pattern | Engraving |
|---|---|---|---|
| 1000 (FIG. 10) | 537-1 | 2-2-S-S | ("LIGHTS", "VOLUME", "ON", "&up", "OFF", &down") |
| 1100 (FIG. 11) | 501-1 | 1-1-1-1-S-S | ("LIGHTS", "FAN", "SHADES", "MUSIC", "ON", "&up", "OFF", &down") |
| 1200 (FIG. 12) | 551-1 | 3-3 | ("LIGHTS ON", "LIGHTS OFF") |
| 1300 (FIG. 13) | 541-1 | 2-2-2 | ("ON", "RAISE", "LOWER") |

Attention is now directed to FIG. 8, and method 800 for programming and configuring a keypad for use in LCS 200 according to aspects of the embodiments. In method step 802, a first unsolvable command $U_1$ is entered, in the manner described above, to alert load controller device 210 that keypad 214 is being put into programming mode. Method step 804, each button of the keypad is actuated according to the sequence of top-to-bottom, and left-to-right for split keys (S). In method step 806, the variant code is entered, in the manner and method as described above (see, e.g., Table 7 and the discussion thereof). In method step 808, a second unresolvable command, $U_2$, is entered, and load controller device 201 is alerted that keypad 210 is being taken out of programming mode. Following this portion of method 800, load controller 210 and LCS 200 has determined the button configuration of keypad 214 and when a user presses or actuates any one of the buttons of keypad 214, LCS 200 will respond appropriately (lower/raise shades, turn the lights on/off, brighten or dim then, turn the volume up or down, or set a scene (as described herein) according to aspects of the embodiments. In optional decision step 810, the user can then determine as to whether or not to engrave the buttons of keypad 214, if they are not already so engraved. If the user decides to engrave the buttons of keypad 214 ("Yes" path from decision step 810), according to aspects of the embodiments, then the engraving method as described in method 1700 can be followed (discussed in greater detail below). If the user determines not to engrave the buttons, or if the buttons are already engraved ("No" path from decision step 810), then method 800 terminates.

Figure 14A:
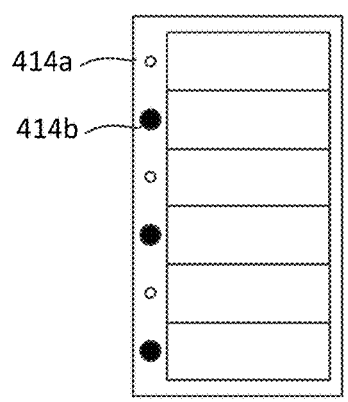
FIGS. 14A and 14B illustrate a first and second blinking pattern, respectively, on a keypad that indicates some action or event according to aspects of the embodiments.
Figure 14B:
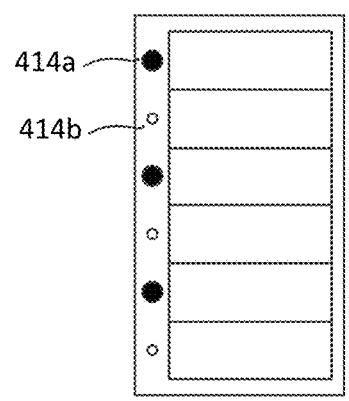

According to further aspects of the embodiments, feedback can be used using indicators 414, as well as haptic, and/or audio/aural indicators (neither of the latter two are shown, but both are considered to be within the scope of the aspects of the embodiments). For example, a first indication can be made to shown that an escape sequence has been entered (unresolvable command U1) has been detected. The first indication can be displayed as alternating lit and unlit indicators 414, starting with an unlit lamp as shown in FIG. 14A and indicator 414a. While in the programming/configuration mode, indicator 414 lights up corresponding to the buttons 212, 214, 216 and 128 (among others) that are being depressed. The final indication that indicates that the "escape sequence" has been exited and a configuration recognized is displayed as alternating lit and unlit indicators 414, starting with a lit indicator 414a, as shown in FIG. 14B, according to aspects of the embodiments.

FIGS. 15A-15C illustrate first through third alternate faceplate panel cutouts 1502, 1504, 1506, which can be used over the switch assembly shown in FIG. 4 for aesthetic purposes. See, https://ww.crestron.com/products/model/CBD-FP-ASCENT and U.S. Provisional Patent Application Ser. No. 62/164,860, filed 21 May 2015, to which the present application claims priority to.

Figures 16A, 16B:
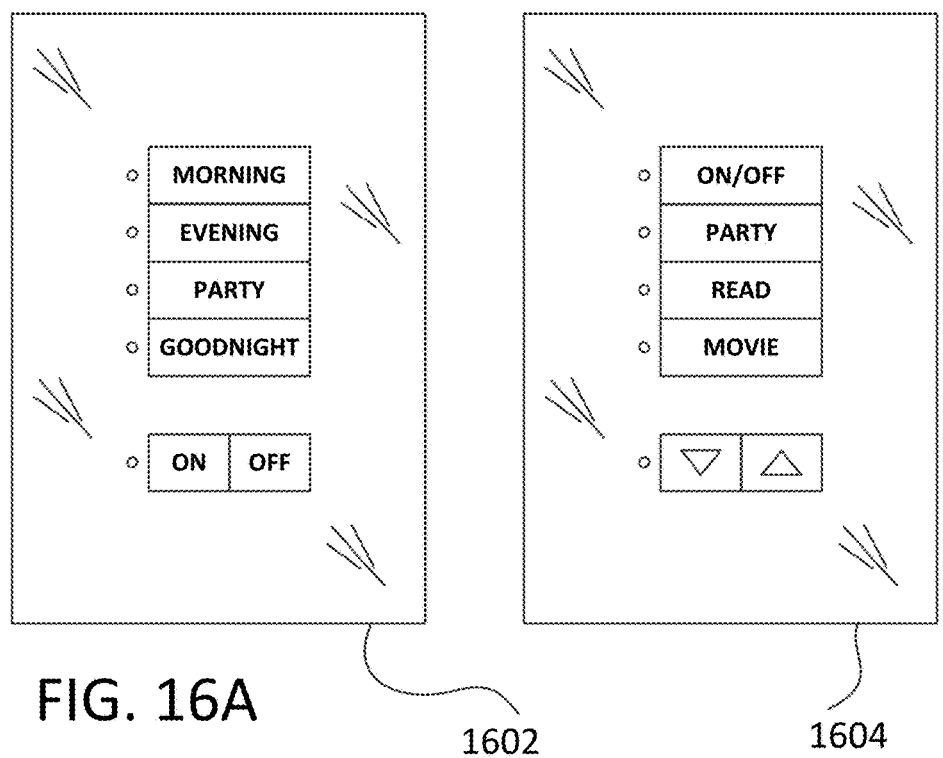
FIGS. 16A and 16B illustrates first and second examples of scene keypads according to aspects of the embodiments.

According to further aspects of the embodiments, the predefined sequence can further correspond to a user profile. For example, a user can prefer pre-configured scene characteristics such as the lighting level of the scene. Upon entering a room, the user can configure keypad 214 to operate according to such scene characteristics by placing keypad 214 in the configuration mode and entering the predefined sequence corresponding to his user preferences. As shown in scene keypads 1602, 1604 of FIGS. 16A and 16B, respectively, such predefined scene characteristics can include a morning, evening, party, and good night scene. The user might press the "on" button, and then "morning" if it was morning to set the audio level to a certain low level, the lights off, the shades up, and so on. If the user desired a "party" scene, this might entail a different set of parameters, such as the lights dimmed, shades down, music up to a certain level, and so on. Further examples of such "scenes" include "goodnight," "read," and "movie," among virtually limitless others according to aspects of the embodiments.

Figure 17:
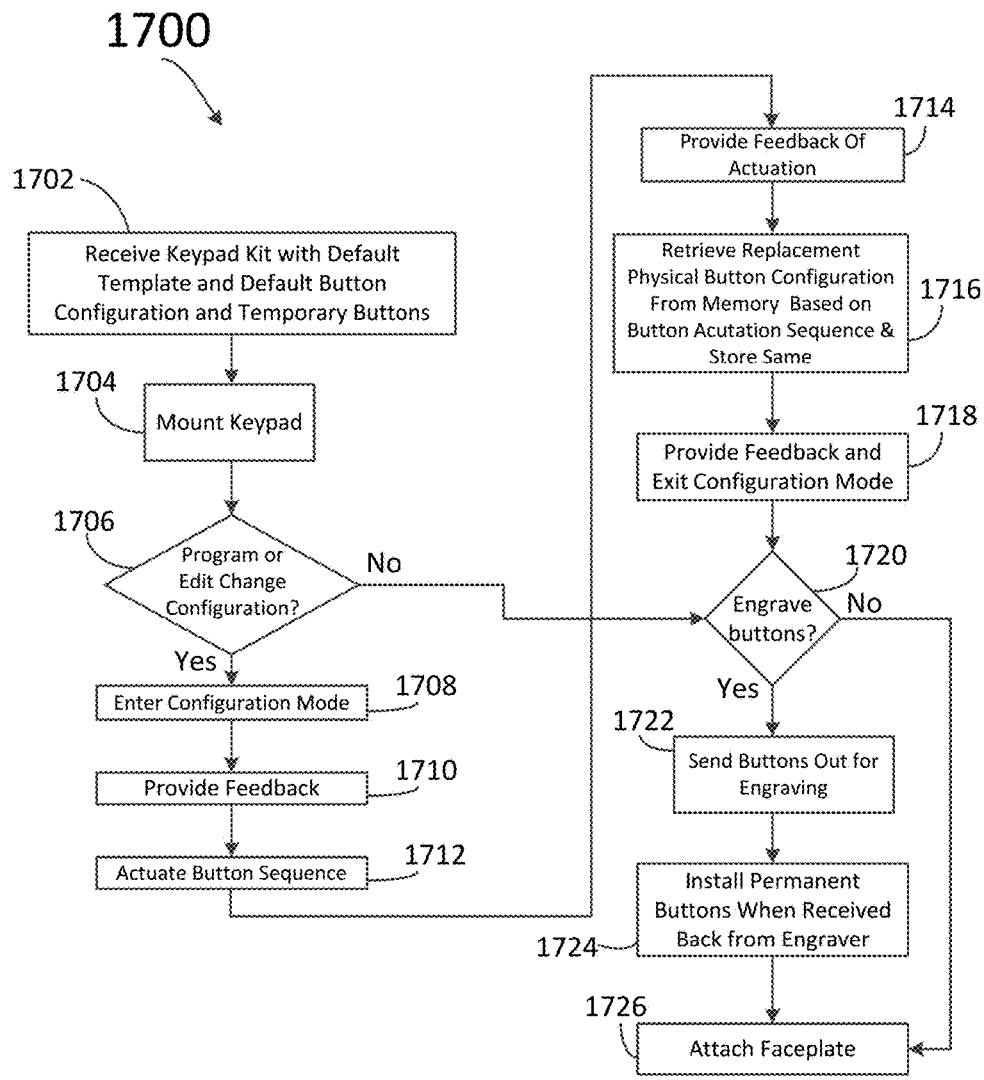
FIG. 17 illustrates a method for programming, configuring, and engraving a four or six row keypad, among other types, according to further aspects of the embodiments.

Attention is now directed to FIG. 17 and method 1700. Method 1700, as shown in FIG. 17, illustrates a more detailed view of the process of programming/configuring keypad 214 according to aspects of the embodiments, as well as the process of engraving, as described in reference to method 800 and FIG. 8, described above. At step 1702, a keypad kit and faceplate 308 are provided. The keypad kit comprises a keypad according to an aspect of the embodiments in a default configuration and with a default functional template. The keypad can comprise one or more buttons. The one or more buttons can be an assortment of single height buttons 222, double height buttons 226, split buttons 224, and triple height buttons 228. According to further aspects of the embodiments, the default configuration of the keypad is a 1-1-1-1-S-S button configuration as shown in FIG. 3, and keypad 214. Faceplate 308 can be provided as part of the keypad kit or can be provided separately.

The button functionality of the keypad can be programmed according to user preference. However, different button configurations used by different users can also implement similar button functionality according to further aspects of the embodiments. Accordingly, each button configuration (i.e., the set of buttons and their corresponding functionality that make up the keypad) can be configured with one of the four following functional templates: (1) Lighting Template, (2) Window Shade Template, (3) Lighting/Window Shade Combination Template, and (4) Multiple Device Template. According to further aspects of the embodiments, the templates can refer to scenes as described above. Each lighting template comprises at least a common core of button functions for controlling lighting loads 204 for each configuration. Similarly, each window shade template and lighting/window shade combination template comprises common button functions for controlling window shades 206 or both lighting loads 204 and window shades 206, respectively. Examples of such common functions for shades include "Open All," Close All," among others, and examples of such common functions for lighting loads include "All—Full On," "All—Off," among others. Template number (4), Multiple Device, provides a template in which the buttons of the button assembly either has no assigned functionality, or has a functionality that includes audio devices, security devices, phone devices, heating/air conditioning devices, among others. Thus, the Multiple Device Template provides a blank slate for customized programming.

According to further aspects of the embodiments, the default functionality template is the Lighting Template. The default functionality template can, for example, correspond to the button functionality of the keypad shown in FIG. 3 with three scene selection buttons 222a-c, an off button 22d, and two raise and lower sets of buttons 224a-d (e.g., 224a=raise first set of lights from off to on, 224b=lower first set of lights from on to off, and substantially similarly with buttons 224c,d).

The selected keypad and one or more buttons can be provided directly to the customer or to an installer by the manufacturer, or can be provided via one or more intermediary distributors or original equipment manufacturers (OEMs). It should be noted that while the customer and installer are described herein as distinct entities, it is contemplated that a customer may install the selected and purchased keypad.

In method step 1704, the installer mounts the keypad received in step 1702 in a wall box at a customer site. Keypads according to aspects of the embodiments are configured to mount in an industry standard wall box with one or more mounting screws.

The customer and installer then determine, in decision step 1706, whether to program and configure keypad 214. Beginning with method step 1706, and proceeding to step 1718, method 1700 roughly approximates method 800 and method steps 802-808. The programming and configuring of keypad 214 is based on the installed equipment, and the functionality built therein. According to aspects of the embodiments, each functional template has associated with it a default set of button configurations.

If the user decides to program/configure keypad 214 ("Yes" path from decision step 1706), the user performs method step 1708 to program/configure keypad 214. As described above, method step 1708, substantially similar to method step 802, involves entering unresolvable command $U_1$ in the manner as described above. The installer places the keypad in the configuration mode by inputting an unresolvable command to the keypad with simultaneous actuation of two buttons for a predetermined amount of time. For example, the user may press and hold a first button, such as the first scene button 222a (if the selected keypad is the one as shown in FIG. 3), and a second button, such as the second scene button 222b, for a predetermined amount of time, such as five (5) seconds, to place the keypad in the configuration mode. Such lengths of time, and specific keys and orders of pressing keys are but by way of non-limiting example only. In fulfillment of the dual purposes of clarity and brevity, method steps 802-810 having been described in detail above, a detailed discussion of the same need not be repeated at this point. If the User decides not to program/configure keypad 214, method 1700 proceeds to step 1720, in which the user can decide to engrave the buttons. If the buttons are already engraved, no further action is necessary, although the user can order new engraved buttons; if however the user decides to get the buttons engraved, then method steps 1722-1726 can be performed, as described below.

Following method step 1708, in method step 1710, LCS 200 can optionally provide feedback in the manner already described. Such feedback can include one or more of an visual indication (blinking of indicators 414), aural/audio indicator, or haptic feedback. In method step 1712, the user then actuates each of the buttons, in the manner already described (substantially corresponding to method step 804, in which the buttons are actuated top-to-bottom, and left-to-right for split (S) buttons) according to aspects of the embodiments, including adding the variants. In method step 1714, further feedback can be provided, again in a manner substantially similar to that as already described immediately above, and in regard to method 800 and elsewhere herein.

In method step 1716 keypad 214 is programmed with the physical button configuration stored in memory based on the button tapping or actuation sequence (of method step 1712) and saves it as the new physical button configuration. From this point on (following completion of the programming of the keypad, and method 1700/800), keypad 214 will be programmed and configured with the button configuration associated with the variants and button sequence as entered in step 804, as this information is stored in memory of load control device 210 of LCS 200 according to aspects of the embodiments. According to further aspects of the embodiments, such variants can also include scenes as described above.

In method step 1718, keypad 214 can provide feedback that keypad 214 has been programmed and configured (or a preprogrammed scene assigned to it) according to aspects of the embodiments. At this point, in method step 1718, the user enters the second unresolvable command $U_2$, which can be the same or different as the first unresolvable command $U_1$, and this takes keypad 214 out of the programming/configuration mode. According to further aspects of the embodiments, keypad 214 can provide feedback that the keypad has exited programming/configuration mode.

According to further aspects of the embodiments, predefined sequences need not all comprise four button actuations; in some cases, a predefined sequence can comprise one, two, three or five or more button tappings or actuations. According to further aspects of the embodiments, method 800/1700 and keypad 214 includes a timer function (not shown) that starts timing after each button tapping/actuation. If the timer times out it prior to a next button tapping/actuation, the keypad presumes that all of the actuations have occurred and the user/installer has entered the predefined sequence as intended. Keypad 214 and method 800/1700 then performs the lookup as described above, and selects a physical button configuration from memory based on the input sequence. According to further aspects of the embodiments, keypad 214 can provide aural, visual, and/or haptic indications of the name of the selected sequence and physical button configuration, or the keypad can include a display panel that provides a brief written description of the selected physical button configuration.

In method step 1720, the user can make a determination as to whether to get the installed physical buttons physically engraved. The one or more buttons are adapted for being engraved with a legend using an engraving process. Commonly assigned U.S. Pat. No. 8,102,375 entitled "Dimmable Keypad Device Suitable for Multiple Faceplate and Legend Colors," describes a process for engraving buttons of various colors with legends as well as various backlighting schemes that depend on a foreground color and background color of the keypad buttons.

If the customer desires engraved buttons ("Yes" path from decision step 1720), the permanent buttons are removed, temporary buttons are then installed, and the permanent buttons are sent to the engraver in steps 1722. In step 1724, the blank buttons are replaced with the engraved buttons, and then in method step 1726, faceplate 308 is (re)attached.

If, however, engraved buttons are not desired ("No" path from decision step 1720), a replacement button configuration can be selected. The replacement button configuration can comprise one or more of the additional buttons of the keypad kit, and is installed in method step 1726, wherein the faceplate is also installed.

According to further aspects of the embodiments, the predefined sequence corresponds to physical characteristics or a user profile. For example, the predefined sequence can also correspond to a button color. As described in commonly assigned U.S. Pat. No. 8,102,375, optimal keypad backlighting may be dependent on the button color. Accordingly, the keypad may alter the backlighting operation dependent on the button color as determined from the predefined sequence.

It will also be appreciated that the keypad can be configured via actuations of the buttons in a predefined sequence when the button configuration is being modified from a non-default button configuration. Any button configuration with two or more buttons may be placed in the configuration mode by actuating two buttons for the predetermined time period. Once in the configuration mode, a predefined sequence of button actuations can occur. According to aspects of the embodiments, the predefined sequence can be dependent on the original button configuration and can correspond to the replacement button configuration and the replacement functionality template.

Described in detail herein are numerous aspects of using a six row keypad and its buttons to program and configure the same, as well as to control a local load environment. The manner of programming and configuring of keypad 214 makes use of the novel and unobvious technique of resolvable and unresolvable commands as generated by the buttons actuating electro-mechanical switches, as described and discussed in detail above. It can or should be appreciated by those of skill in the art, however, that such techniques are not limited to six row keypad, nor those keypads adapted to use buttons as a means for causing actions to occur in LCS 200 according to aspects of the embodiments. For example, a four row keypad can also be used to program and configure itself in a substantially similar manner using not the same but equivalently determined tactile-switch generated codes or digital words.

Such a four row keypad is described in commonly assigned U.S. Pat. No. 8,149,591, entitled "Wall Box Dimmer." The four row keypad of the '591 patent includes a dual function air-gap switch actuator incorporated into the generally planar face of the wall box dimmer. The switch actuator can be finger operated and provides both a main power disconnect via one or more air-gap contacts and the means to activate a secondary function; such a secondary function can include the ability to program and configure a rocker arm switch that can be used in the four row keypad as described in the '591 patent according to aspects of the embodiments. The dual function air-gap switch actuator can be optionally fitted with an indicator lamp. FIGS. 18-23 describe in greater detail the four row keypad and its ability to use the air-gap switch actuator to indicate a rocker arm switch according to aspects of the embodiments.

Figure 18:
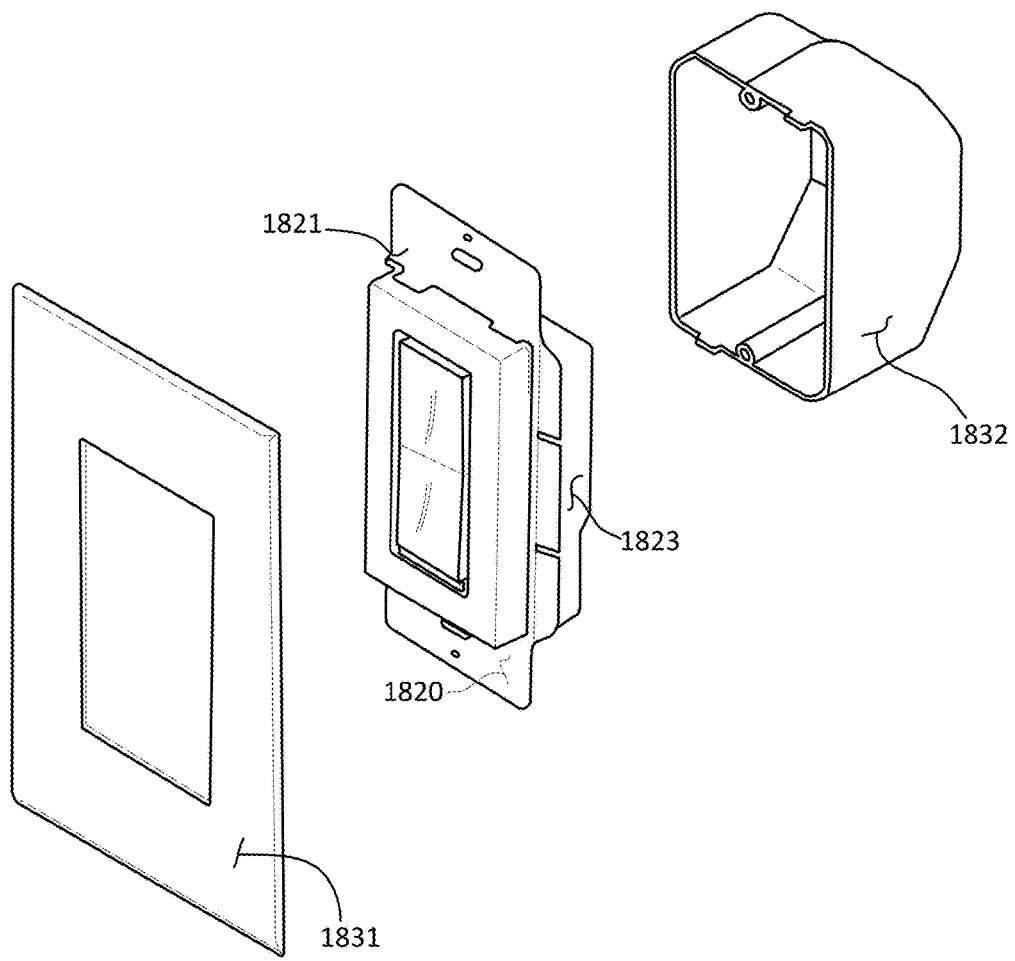
FIG. 18 illustrates a perspective view of a wall box dimmer (with a decorative faceplate shown) and showing the novel dual function air-gap switch actuator in the closed "power on" position according to aspects of the embodiments.

FIG. 18 Referring now to FIG. 18, there is shown a wall box dimmer 1820, which has a generally planar bezel of any suitable material such as molded plastic and an enclosure 1821 that includes various electronics components. According to aspects of the embodiments, the bezel is actually a subcomponent of a removable bezel kit (not shown), which also other components which will be described below.

The wall box dimmer 1820 is typically installed in electrical wall box 1832 as is well known to those skilled in the art of residential and commercial construction. The dimmer bezel extends through an opening in faceplate 1831. Those skilled in the art will recognize that faceplate 1831 can be further comprised of a mounting plate portion and a snap-connect decorative faceplate portion. All of these parts can be manufactured from molded plastic.

Figure 19:
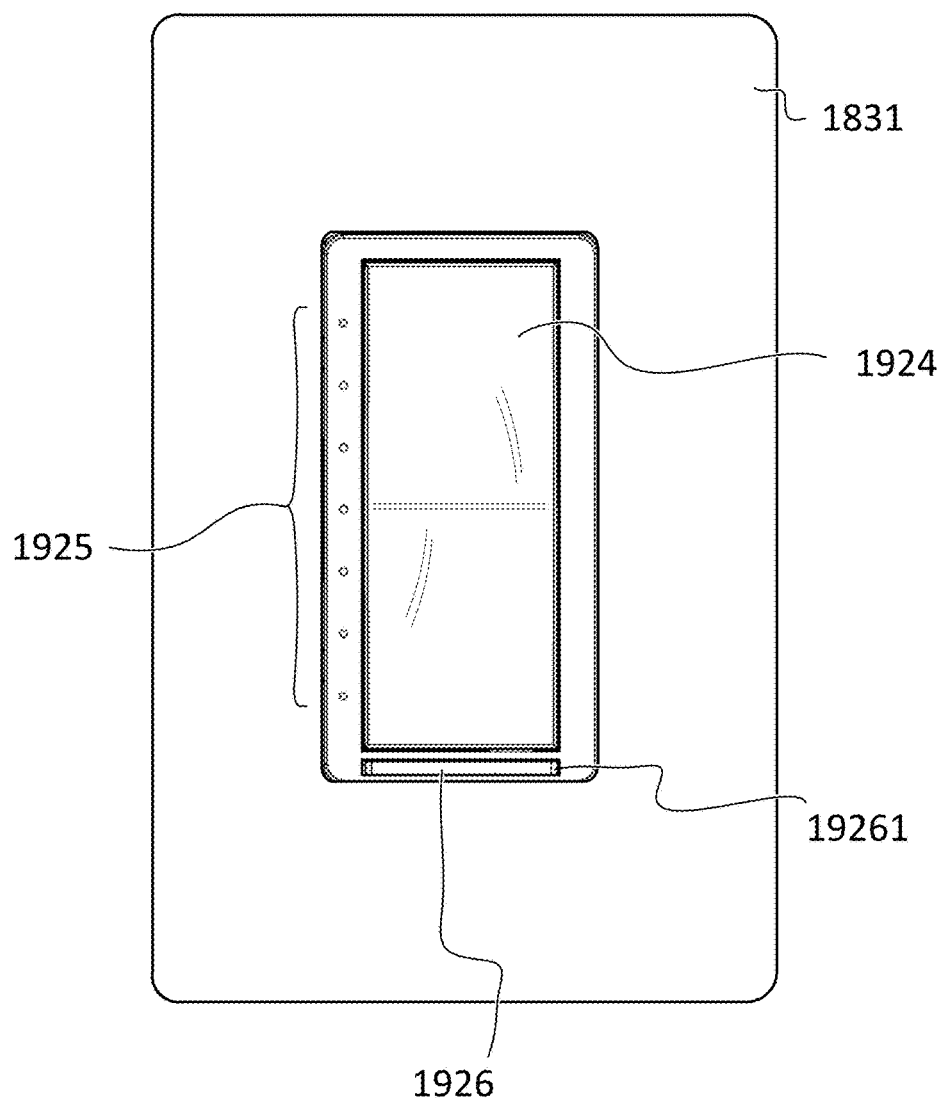
FIG. 19 illustrates a front view of the wall box dimmer shown in FIG. 18 according to aspects of the embodiments.

FIG. 19 illustrates further detail of the components that comprise bezel kit 2022, according to as aspect of the embodiments, as seen through faceplate 1831 such as in a typical residential installation. A primary dimming function for wall box dimmer 1820 is activated by an operator using primary function button 1924, such as for example a rocker actuator. Operator feedback, such as button status, dimming level, wireless network signal, or lighting system environmental 'green' level is indicated by a vertical indicator, such as a vertical column of light emitting diodes 1925. The dual function air-gap switch actuator 1926 allows for physical disconnect of the lighting load. According to further aspects of the embodiments, the operator can depress a first end portion 19261 of dual function air-gap switch actuator 1926 to activate a secondary function, such as setting a default dimming schedule, or identifying the switch as a rocker arm switch in lieu of actuating one or more tactile switches 420 according to aspects of the embodiments.

Figure 20:
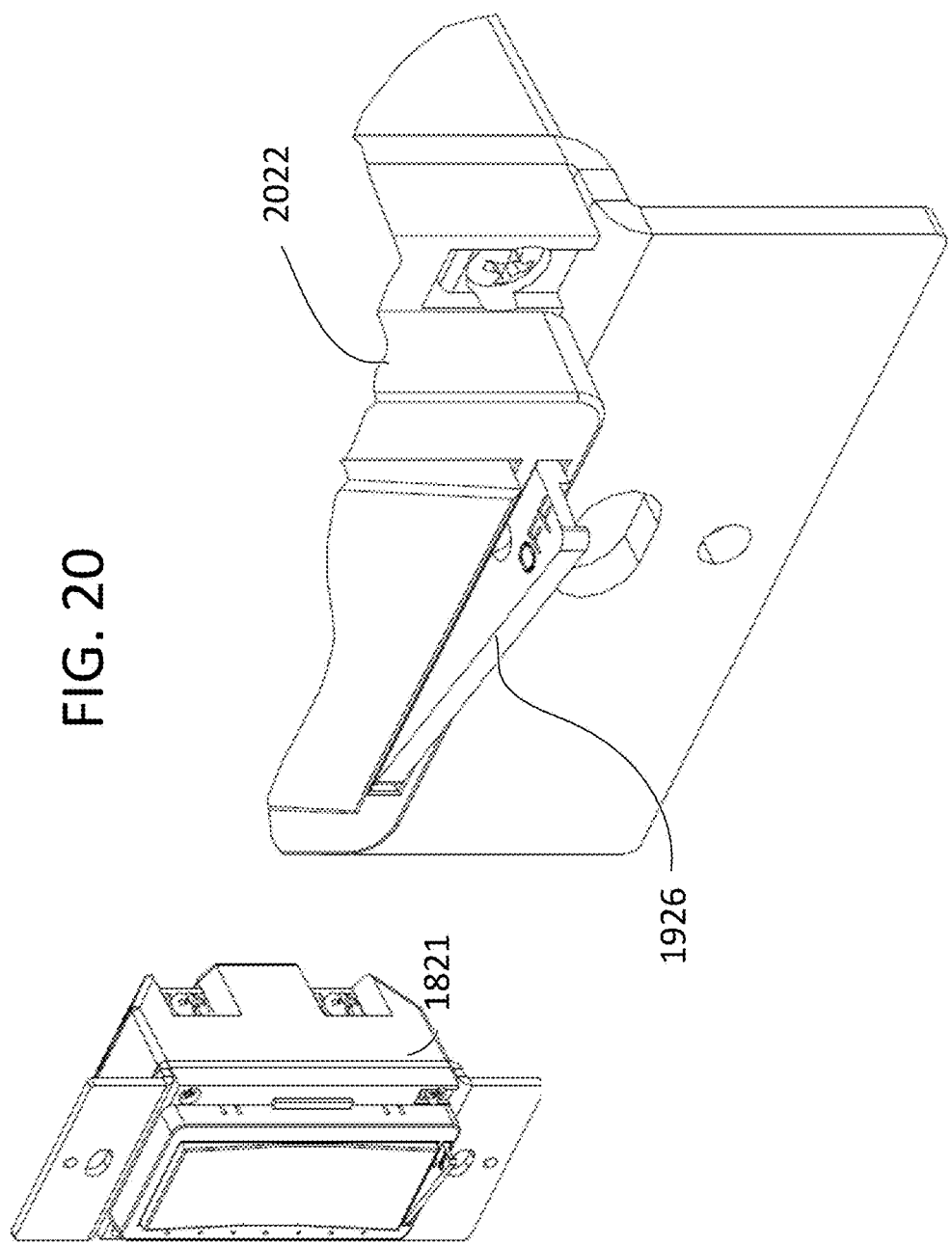
FIG. 20 further illustrates the wall box dimmer of FIG. 18 showing the dual function air-gap switch actuator in the open "power off" position according to aspects of the embodiments.

Attention is now directed to FIG. 20, which shows dual function air-gap switch actuator 1926 in the open, power "OFF" position in accordance with an aspect of the embodiments. In this embodiment, the air-gap contacts internal to dimmer enclosure 1821 are configured as a micro-switch that is opened and closed by rotary motion of air-gap switch actuator 1926. According to further aspects of the embodiments, separating bezel kit 2022 from enclosure 1821 causes the air-gap contacts to open thereby protecting the user from exposure to potentially live electrical components.

According to further aspects of the embodiments, dual function air-gap switch actuator 1926 can be implemented as a small horizontal lever and has been designed such that when rotated in one direction, opens a micro switch that physically disconnects the lighting load from the alternating current (AC) line. This lever sits directly below the device's buttons, and blends in aesthetically.

Figure 21:
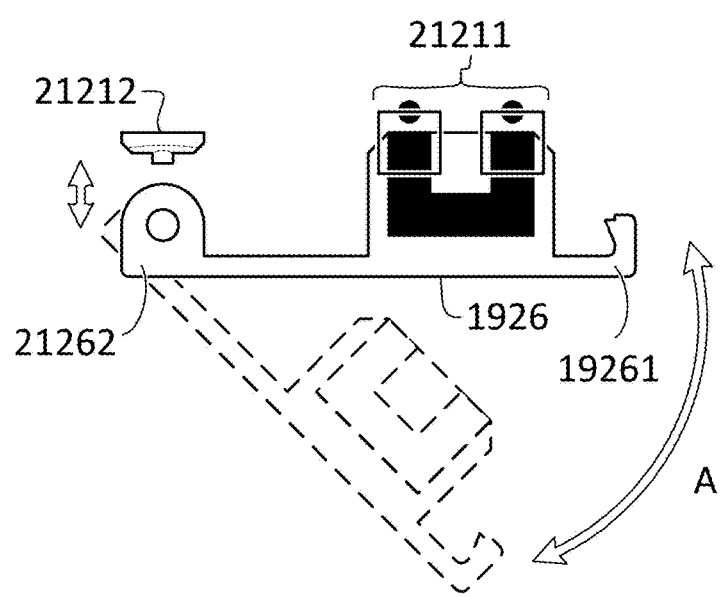
FIG. 21 further illustrates the dual function nature of the switch actuator by depicting a second embodiment according to aspects of the embodiments.

FIG. 21 further illustrates the dual function nature of the inventive switch actuator by depicting a further aspect of the embodiments. In this embodiment, air-gap contacts 21211 are conductively connected through air-gap switch actuator 1926 and are opened and closed by an operator grasping and pulling on first end portion 19261 of dual function air-gap switch actuator 1926 in a rotary fashion (as indicated by arrow A). A depression of second end portion 21262, of dual function air-gap switch actuator 1926, in a linear fashion, activates secondary function switch 21212, mounted within enclosure 1821. According to still further aspects of the embodiments, the secondary function is activated by depressing first end portion 19261 of dual function air-gap switch actuator 1926 in a linear fashion. Significantly, the full front appearance of the entire assembly (with dual function air-gap switch actuator 1926 in the closed "power on" position and the internal dual function air-gap switch closed) is that of a substantially flat uncluttered surface. (See, for example, the substantial planarity of the front surface in FIG. 18).

Other embodiments incorporate different configurations of air-gap contacts and different switch configurations for activating the secondary function. According to still further aspects of the embodiments, the secondary function is provided without requiring additional awkwardly placed switches or the like. This secondary function can include a number of functions, including but not limited to: (a) an internal software reset, (b) providing a "save" functionality when tapped to allow the end user to adjust stored lighting preset levels, (c) providing a synchronization function with a centralized lighting controller; or (d) programming/configuring the switch as a rocker arm switch if that is the case, according to still further aspects of embodiments.

FIG. 22 illustrates a further aspect of the embodiment of the inventive dimmer in which various configurations of buttons have been incorporated into bezel kit 1823. According to aspect, the particular button configuration can be altered without removing wall box dimmer 1820 from electrical wall box 1832, as shown in FIG. 18. Changing button configurations can be accomplished by simply removing bezel kit 2022 and changing out the buttons.

The button functions, with the exception of the air-gap switch contacts, are all software configurable. For example, in certain embodiments, multiple secondary functions are provided by the dual function switch actuator 1926: (a) a single short tap stores the present lighting level as a preset; and (b) a continuous resets the programmed brightness levels to factory set defaults or downloads the default levels from a central lighting controller.

The wall box dimmer consists of enclosure 1821 and attached bezel kit 2022. Bezel kit 2022 consists of bezel 1823 that includes a vertical column of LEDs 1925 and the inventive dual function switch actuator 1926. In this embodiment, one primary function button 22241 can installed within bezel 1823 and the vertical column of LEDs

1925 can configured as a bar graph indicator that indicates the commanded lighting level.

According to further aspects of the embodiments, the installer can place the keypad in configuration mode and take the keypad out of configuration mode with a second predefined sequence of button actuations to the keypad. For example, the installer can tap the first button twice and then hold the first button for the predetermined amount of time.

Aspects of the embodiments are described herein showing keypads having one button configuration. However, the button configuration procedure of the aspects of the embodiments is not limited only to one or two button configurations, but allows the keypad to have three or more button configurations. Further, the aspects of the embodiments are not limited to keypads only having a maximum of six rows of buttons.

According to still further aspects of the embodiments, the process of changing the template and configuration of each of the keypads in a load control system, e.g., method 800/1700, can be performed for each keypad; or, alternatively, one keypad template and configuration change can be performed and the programming applied to all of the keypads (if of the same physical construct) in the load control system.

Figure 23:
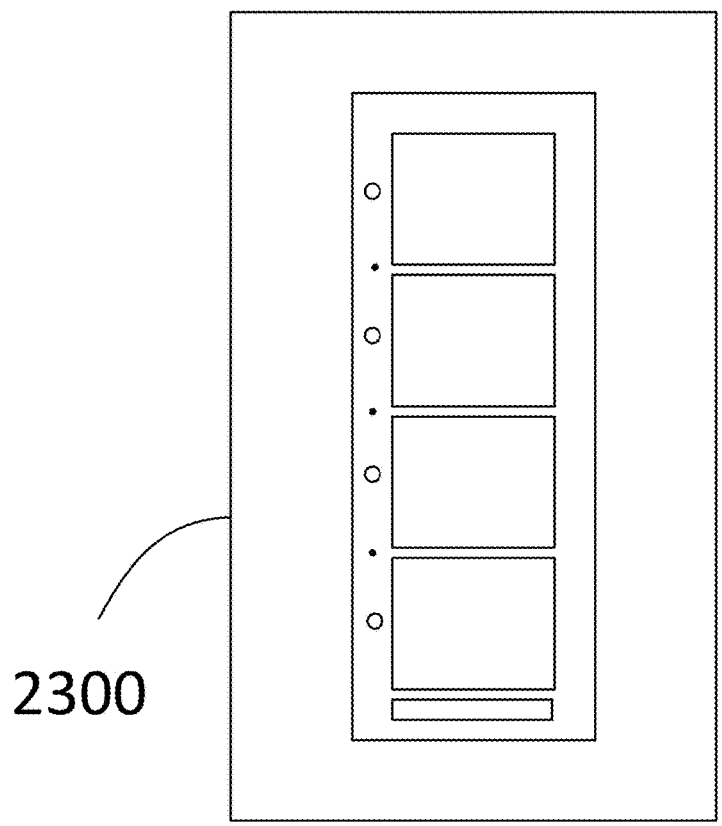
Figure 24:
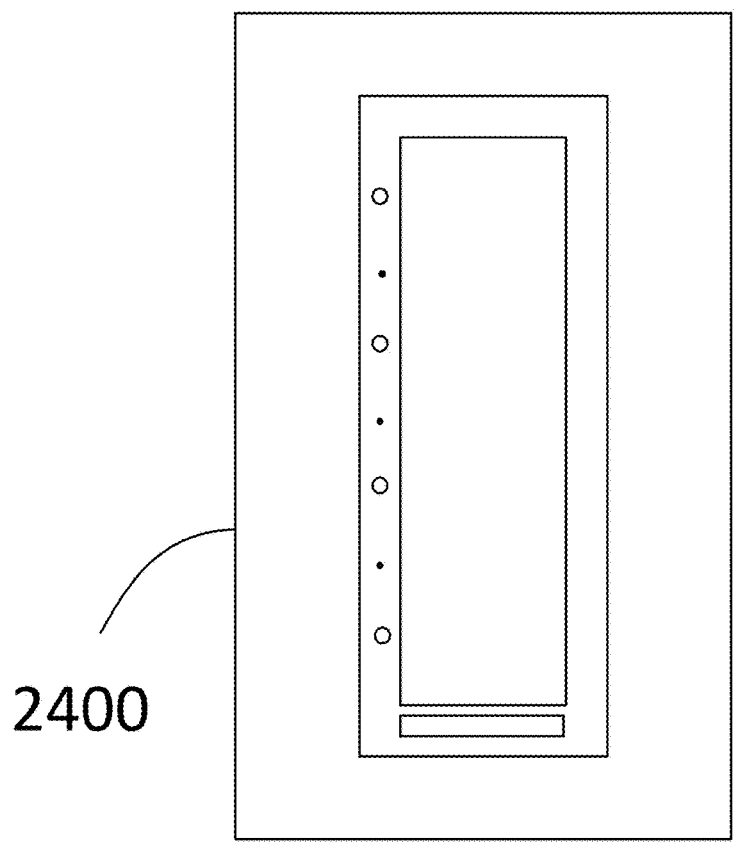

According to aspects of the embodiments, the CLW-DIMEX-P keypad/dimmers, shown in FIGS. 23 to 25, embodied as first through seventh four row keypads 2300-2900, and manufactured by Crestron Electronics, Inc., of Rockleigh, N.J., is a Cameo® in-wall dimmer that features field-replaceable, engravable buttons. The CLW-DIMEX-P is an example of a keypad that can be programmed as described above in regard to the four row keypads. Along with the entire line of new Cameo products, it can be configured with various button layouts and designer colors, making the CLW-DIMEX-P more versatile and affordable than previous generations of in-wall dimmers. Its streamlined design matches the entire line of Cameo dimmers, switches and keypads, making it a great addition to new or retrofit installations. In addition to its attractive look and feel, infiNET EX® communication technology brings proven reliability to the CLW-DIMEX-P.

Like other Cameo keypads, the buttons on the CLW-DIMEX-P can be swapped in the field, making it easy to change engraving or color after installation. The new rocker controller brings a familiar user interface to the Crestron in-wall dimmer, while the versatility of up to 4 buttons takes advantage of prime single-gang wall box real estate. It allows operators or installers to use buttons to control in-room audio or lamps in addition to any other light connected to the system. The comprehensive list of designer colors blends the CLW-DIMEX-P into virtually any décor and style, suiting even the most exquisite space.

Because the CLW-DIMEX-P is attached to the Crestron network, it can also function as a keypad, sending commands to trigger whole-room lighting scenes or distributed audio functions. Supporting up to four buttons, the in-wall dimmer serves as a great user control interface in any Crestron system. Its single-gang form factor maximizes control capability in a small space while increasing the opportunity for Crestron control in every room.

Ultra-reliable infiNET EX wireless technology provides steadfast 2-way RF communications throughout a residential or commercial structure without the need for physical control wiring. Employing a 2.4 GHz mesh network topology, each infiNET EX device functions as an expander, passing command signals through to every other infiNET EX device within range (approximately 150 feet or 46 meters indoors), ensuring that substantially every command reaches its intended destination without disruption.

The CLW-DIMEX-P communicates with a Crestron control system via an infiNET EX Wireless Gateway (model CEN-RFGW-EX, DIN-AP3MEX, or MC3[2]). Up to 100 infiNET EX devices, including Cameo® Wireless Keypads and In-Wall Switches[2], may coexist on a single wireless network, and every device that is added to the network effectively increases the range and stability of the entire network by providing multiple redundant signal paths.

In addition to field-replaceable buttons, the CLW-DIMEX-P features screw-clamp connectors for simplified wiring while reducing installation time and material costs. The Cameo line can be installed in standard gang boxes making them the perfect choice for both new and retrofit projects.

The CLW-DIMEX-P supports dimming control of the same lights from more than one location. Easily replace existing dimmers and switches wired in a traditional 3- or 4-way circuit with dim control from every location, or design new projects to accommodate remote dimmers wherever desired. The CLW-SLVU-P remote dimmer simply connects to the "traveler" wire and dims the load attached to the CLW-DIMEX-P. (See, http://www.crestron.com/products/model/clw-dimex-p#sthash.UjXhsu5X.dpuf)

All United States patents and applications, foreign patents, and publications discussed above are hereby incorporated herein by reference in their entireties.

INDUSTRIAL APPLICABILITY

To solve the aforementioned problems, aspects of the embodiments provide a unique device in which one or more of a plurality of keypad configurations can be configured with a new button configuration.

Alternate Embodiments

Alternate embodiments may be devised without departing from the spirit or the scope of the invention. For example, the keypad can provide audible feedback as opposed to or in addition to visual feedback.

What is claimed is:

1. A method for configuring a keypad of a load control system comprising:
   providing the keypad comprising a button assembly, the button assembly having a plurality of buttons, arranged in a known order;
   entering a configuration mode of the keypad by actuating a first subset of the plurality of buttons according to a first predefined sequence;
   determining the number and type of buttons by actuating each of the plurality of buttons according to a second predefined sequence;
   assigning a predefined set of functions to each of the determined plurality of buttons in the button assembly by actuating a second subset of the determined plurality of buttons according to a third predefined sequence; and
   exiting the configuration mode by actuating a third subset of the determined plurality of buttons according to a fourth predefined sequence.

2. The method according to claim 1, wherein the step of entering a configuration mode comprises:
   actuating a first unresolvable command by actuating two or more buttons substantially simultaneously.

3. The method according to claim 1, wherein the second predefined sequence comprises:

actuating each of the plurality of buttons according to the order of top-to-bottom, and left-to-right in the event of split buttons, wherein split buttons each occupy one-half of a row of buttons.

4. The method according to claim 1, wherein the step of assigning a predefined set of functions to each of the determined buttons comprises:
actuating one or more of the plurality of buttons following the step of determining the number and type of buttons by actuating each of the buttons according to the second predefined sequence.

5. The method according to claim 1, wherein the step of exiting the configuration mode comprises:
actuating a second unresolvable command by actuating two or more buttons substantially simultaneously.

6. The method according to claim 1, wherein the first predefined sequence and the second predefined sequence comprises:
entering a first unresolvable command, and entering a second unresolvable command, respectively, and wherein an unresolvable command is one that defined by actuation of the buttons to generate a digital word that is not unique to a button type and location.

7. The method according to claim 6, wherein the first and second unresolvable commands are not the same.

8. The method according to claim 6, wherein the first and second unresolvable commands are the same.

9. The method according to claim 1, further comprising:
engraving the buttons on the keypad.

10. A keypad adapted to control a load control system comprising:
a button assembly, the button assembly having a plurality of buttons, arranged in a known order,
the keypad adapted to enter a configuration mode by actuating a first subset of the plurality of buttons according to a first predefined sequence,
the keypad further adapted to determine the number and type of buttons by actuating each of the plurality of buttons according to a second predefined sequence,
the keypad further adapted to assign a predefined set of functions to each of the determined plurality of buttons in the button assembly by actuating a second subset of the determined plurality of buttons according to a third predefined sequence, and
the keypad further adapted to exit the configuration mode by actuating a third subset of the determined plurality of buttons according to a fourth predefined sequence.

* * * * *